US010766340B2

(12) United States Patent
Lee et al.

(10) Patent No.: US 10,766,340 B2
(45) Date of Patent: Sep. 8, 2020

(54) AIR CONDITIONER SYSTEM FOR VEHICLE

(71) Applicant: HANON SYSTEMS, Daejeon (KR)

(72) Inventors: Hae Jun Lee, Daejeon (KR); Yong Nam Ahn, Daejeon (KR); Sang Min Lee, Daejeon (KR); Jun Young Choi, Daejeon (KR)

(73) Assignee: HANON SYSTEMS, Daejeon (KP)

( * ) Notice: Subject to any disclaimer, the term of this patent is extended or adjusted under 35 U.S.C. 154(b) by 107 days.

(21) Appl. No.: 15/310,122

(22) PCT Filed: Jun. 23, 2015

(86) PCT No.: PCT/KR2015/006355
§ 371 (c)(1),
(2) Date: Nov. 10, 2016

(87) PCT Pub. No.: WO2016/017927
PCT Pub. Date: Feb. 4, 2016

(65) Prior Publication Data
US 2017/0246934 A1    Aug. 31, 2017

(30) Foreign Application Priority Data

Jul. 29, 2014 (KR) .................. 10-2014-0096562
Jul. 31, 2014 (KR) .................. 10-2014-0098066
Jul. 31, 2014 (KR) .................. 10-2014-0098074

(51) Int. Cl.
B60H 1/32 (2006.01)
F25B 1/10 (2006.01)
F25B 6/04 (2006.01)

(52) U.S. Cl.
CPC ......... B60H 1/3229 (2013.01); B60H 1/3227 (2013.01); B60H 1/32281 (2019.05);
(Continued)

(58) Field of Classification Search
CPC ............... B60H 1/3229; B60H 1/3227; B60H 2001/3288; B60H 2001/3289;
(Continued)

(56) References Cited

U.S. PATENT DOCUMENTS 3,087,312 A * 4/1963 White .................. B60H 1/3227
                                                          62/241
3,812,687 A * 5/1974 Stolz .......................... F25B 1/00
                                                          62/244
(Continued)

FOREIGN PATENT DOCUMENTS

CN          1456853 A         11/2003
CN       203078254 U          7/2013
(Continued)

OTHER PUBLICATIONS

International Search Report and Written Opinion dated Oct. 7, 2015 from International Patent Application Serial No. PCT/KR2015/006355 (With English Translation of International Search Report).

Primary Examiner — Jianying C Atkisson
Assistant Examiner — Miguel A Diaz
(74) Attorney, Agent, or Firm — Dickinson Wright PLLC

(57) ABSTRACT

The present invention relates to an air conditioner system, in which an air-cooled condenser mounted on a refrigerant circulation line between a water-cooled condenser and an expansion valve and a blower fan for blowing air to the air-cooled condenser are arranged at one side of the water-cooled condenser in a state of being disposed in a row in the air flow direction and are arranged within the width of the one side of the water-cooled condenser, thereby enabling the enhancement of installability and assemblability inside an engine room by simplifying and reducing the package, reducing noise of the blower fan and securing adequate cooling performance because of the blower fan disposed (Continued)

between two air-cooled heat exchangers even when inflowing air is insufficient, such as in an idling condition.

7 Claims, 20 Drawing Sheets

(52) U.S. Cl.
CPC ............... *F25B 1/10* (2013.01); *F25B 6/04* (2013.01); *B60H 2001/3288* (2013.01); *B60H 2001/3291* (2013.01); *F25B 2339/047* (2013.01); *F25B 2400/072* (2013.01)

(58) Field of Classification Search
CPC ........ B60H 2001/3291; B60H 1/00328; B60H 1/00342; B60H 1/00457; B60H 1/00464; B60H 1/00507; B60H 1/00514; B60H 1/00921; B60H 1/32; B60H 1/3204; B60H 1/3211; B60H 1/3213; F25B 2400/072; F25B 6/04
See application file for complete search history.

(56) References Cited

U.S. PATENT DOCUMENTS

| | | | | |
|---|---|---|---|---|
| 4,905,478 | A * | 3/1990 | Matsuda | B61D 27/0018 62/244 |
| 4,938,303 | A * | 7/1990 | Schaal | B60H 1/3227 123/41.48 |
| 5,901,573 | A * | 5/1999 | Kobayashi | B60H 1/3229 165/132 |
| 6,347,528 | B1 * | 2/2002 | Iritani | B60H 1/00357 62/324.6 |
| 6,408,939 | B1 * | 6/2002 | Sugimoto | F28D 1/0435 165/135 |
| 8,037,698 | B2 * | 10/2011 | Heckt | B60H 1/005 62/114 |
| 8,966,918 | B2 * | 3/2015 | Kitaoka | F25D 17/06 62/181 |
| 9,440,512 | B2 * | 9/2016 | Kim | B60H 1/32 |
| 9,592,717 | B2 * | 3/2017 | Katoh | B60H 1/3213 |
| 2002/0002841 | A1 * | 1/2002 | Izawa | B60H 1/00914 62/509 |
| 2003/0140652 | A1 * | 7/2003 | Yamazaki | B60H 1/3229 62/509 |
| 2005/0198995 | A1 * | 9/2005 | Lee | F25B 49/027 62/506 |
| 2007/0012070 | A1 * | 1/2007 | Vetter | B60H 1/00585 62/503 |
| 2008/0023173 | A1 * | 1/2008 | Savage | B60H 1/00328 165/41 |
| 2008/0041071 | A1 * | 2/2008 | Itoh | B60H 1/00342 62/79 |
| 2008/0283215 | A1 * | 11/2008 | Saida | B60H 1/00828 165/43 |
| 2008/0314062 | A1 * | 12/2008 | Ritchey | B01D 53/265 62/291 |
| 2009/0019861 | A1 * | 1/2009 | Heckt | F25B 40/02 62/3.2 |
| 2009/0173088 | A1 * | 7/2009 | Su | F25B 39/04 62/119 |
| 2014/0060099 | A1 * | 3/2014 | Kitaoka | F25D 17/06 62/177 |
| 2014/0075972 | A1 * | 3/2014 | Heyl | B60H 1/00507 62/115 |
| 2014/0096560 | A1 * | 4/2014 | Kim | F24F 7/007 62/426 |
| 2014/0102682 | A1 * | 4/2014 | Kim | F28F 9/00 165/164 |
| 2014/0124159 | A1 * | 5/2014 | Kim | B60H 1/32 165/42 |
| 2014/0290296 | A1 * | 10/2014 | Katoh | F28D 1/0452 62/238.7 |
| 2014/0335434 | A1 * | 11/2014 | Ikeya | B60K 6/32 429/435 |
| 2014/0366565 | A1 * | 12/2014 | Colussi | B60H 1/3201 62/238.3 |
| 2015/0167532 | A1 * | 6/2015 | Kim | B60K 11/04 165/41 |
| 2015/0367710 | A1 * | 12/2015 | Tomonaga | B60H 1/00371 62/498 |
| 2016/0010534 | A1 * | 1/2016 | Kawakami | F28F 9/0234 165/41 |
| 2016/0116192 | A1 * | 4/2016 | Kim | F25B 5/04 62/115 |
| 2016/0153343 | A1 * | 6/2016 | Kakehashi | B60H 1/00278 123/41.31 |
| 2016/0245595 | A1 * | 8/2016 | Jang, II | F28F 9/02 |
| 2016/0297283 | A1 * | 10/2016 | Sakamoto | F25B 47/02 |
| 2016/0311311 | A1 * | 10/2016 | Choi | F25B 6/04 |
| 2017/0067672 | A1 * | 3/2017 | Vakiloroaya | F24H 4/02 |
| 2017/0158022 | A1 * | 6/2017 | Kim | B60H 1/00921 |
| 2017/0158025 | A1 * | 6/2017 | van Hassel | B60H 1/3201 |
| 2017/0197490 | A1 * | 7/2017 | Enomoto | B60H 1/00899 |
| 2017/0203635 | A1 * | 7/2017 | Kuroda | B60H 1/32284 |
| 2017/0246934 | A1 * | 8/2017 | Lee | B60H 1/3227 |
| 2017/0350624 | A1 * | 12/2017 | Kawakubo | F25B 1/10 |
| 2018/0186216 | A1 * | 7/2018 | Song | F25B 39/04 |
| 2018/0194197 | A1 * | 7/2018 | Kozasa | B60H 1/22 |
| 2018/0222289 | A1 * | 8/2018 | Kawakubo | B60H 1/3223 |
| 2019/0337359 | A1 * | 11/2019 | Toyama | F25B 39/04 |
| 2020/0079177 | A1 * | 3/2020 | Ferraris | H01M 10/625 |
| 2020/0171917 | A1 * | 6/2020 | Kim | B60H 1/00328 |

FOREIGN PATENT DOCUMENTS

| | | | | |
|---|---|---|---|---|
| CN | 103596785 | A | | 2/2014 |
| CN | 103808055 | A | | 5/2014 |
| JP | 60146715 | A | * | 8/1985 ........... B60H 1/3229 |
| JP | 61016121 | A | * | 1/1986 ........... B60H 1/3229 |
| JP | 61037525 | A | * | 2/1986 ........... B60H 1/3229 |
| JP | 62094416 | A | * | 4/1987 ........... B60H 1/3229 |
| JP | 09503871 | A | | 2/1997 |
| JP | 2005343221 | A | | 12/2005 |
| JP | 2012184697 | A | | 9/2012 |
| KR | 20030087822 | A | | 11/2003 |
| KR | 20100062925 | A | | 6/2010 |
| KR | 20120062149 | A | | 6/2012 |
| KR | 20120086763 | A | | 8/2012 |
| KR | 20140059616 | A | | 5/2014 |

* cited by examiner

PRIOR ART

PRIOR ART

AIR CONDITIONER SYSTEM FOR VEHICLE

CROSS-REFERENCE TO RELATED APPLICATIONS

This application is a U.S. National Stage of International Application No. PCT/KR2015/006355, filed Jun. 23, 2015, which claims the benefit and priority of KR 10-2014-0096562 filed Jul. 29, 2014, KR 10-2014-0098066 filed Jul. 31, 2014 and KR 10-2014-0098074 filed Jul. 31, 2014. The entire disclosures of each of the above applications are incorporated herein by reference.

TECHNICAL FIELD

The present invention relates to an air conditioner system for a vehicle, and more particularly, to an air conditioner system for a vehicle, in which an air-cooled condenser mounted on a refrigerant circulation line between a water-cooled condenser and an expansion valve and a blower fan for blowing air to the air-cooled condenser are arranged on one side of the water-cooled condenser in a state of being disposed in a row in the air flow direction and are arranged within the width of the one side of the water-cooled condenser.

BACKGROUND ART

In general, as shown in FIG. 1, an air conditioner system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and evaporating the refrigerant to cool the air discharged to the interior of the vehicle due to heat absorption by evaporative latent heat, and that the compressor 1, the condenser 2, the expansion valve 3 and the evaporator 4 are connected with each other via refrigeration pipes. The air conditioner system cools the interior of the vehicle through the following refrigerant circulation process.

When a cooling switch (not shown) of the air conditioner system is turned on, first, the compressor 1 inhales and compresses gas-phase refrigerant of low-temperature and low-pressure while driving by driving power of an engine or a motor, and then sends the refrigerant in the gaseous phase of high-temperature and high-pressure to the condenser 2. Then, the condenser 2 condenses the gas-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the gas-phase refrigerant is inhaled into the compressor 1, and then, recirculates the refrigeration cycle as described above.

In the refrigerant circulation process, as described above, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Meanwhile, the condenser 2 which is an air-cooled condenser is mounted at the front side of the vehicle to cool the refrigerant using traveling wind from the front of the vehicle.

However, if the air-cooled condenser is mounted at the front side of the vehicle, a cooling module package mounted at the front side of the vehicle becomes excessively bigger. Moreover, when the vehicle idles, because air of high-temperature in an engine room flows backward toward the front side of the vehicle and is induced into the air-cooled condenser, temperature of the air induced into the air-cooled condenser gets higher, and it causes deterioration in air-conditioning performance.

Recently, in order to enhance air-conditioning performance, a water-cooled condenser 20 and an internal heat exchanger 25 are applied to an air conditioner system. Referring to FIG. 2, the water-cooled condenser 20 heat-exchanges the refrigerant discharged to the compressor 1 with coolant to condense the refrigerant.

That is, coolant circulating inside a water-cooled radiator 50 mounted in an engine room of the vehicle is supplied into the water-cooled condenser 20 and exchanges heat with the gas-phase refrigerant discharged from the compressor 1, so that the gas-phase refrigerant is cooled and condensed to be changed into a liquid-phase refrigerant.

The water-cooled radiator 50 exchanges heat between the coolant flowing inside the water-cooled radiator 50 and the air by a water pump (WP) to cool electronic units of the vehicle, such as a battery, an inverter, a motor and so on.

Moreover, the internal heat exchanger 25 exchanges heat between the refrigerant discharged from the water-cooled condenser 20 and the refrigerant discharged from the evaporator 4.

Therefore, the refrigerant discharged from the water-cooled condenser 20 enhances air-conditioning performance through supercooling because being further cooled in the internal heat exchanger 25 and flowing to the expansion valve 3.

In the meantime, a receiver drier 30 which separates the refrigerant passing through the water-cooled condenser 20 into gas-phase refrigerant and liquid-phase refrigerant is mounted.

Furthermore, not shown in the drawings, but, the water-cooled condenser 20 is partitioned into a condensing region and a supercooling region through a baffle (not shown). In this instance, the refrigerant passing through the condensing region of the water-cooled condenser 20 is induced into the receiver drier 30, and the refrigerant induced into the receiver drier 30 flows to the supercooling region of the water-cooled condenser 20 to be supercooled, and then, is induced into the internal heat exchanger 25.

However, in the conventional air conditioner system, when the vehicle idles or when the outdoor temperature rises, temperature of the coolant passing the water-cooled radiator 50 also rises. In this instance, when temperature of the coolant rises, temperature of the refrigerant of the water-cooled condenser 20 which exchanges heat with the coolant also rises so that the refrigerant is induced into the internal heat exchanger 25. After that, the refrigerant is induced into the expansion valve 3 and the evaporator 4, and it causes deterioration in air-conditioning performance.

Additionally, due to the limit of the outdoor temperature which cools the coolant of the water-cooled radiator 50, temperature of the coolant of the water-cooled radiator 50 is high and the water-cooled condenser 20 does not provide sufficient condensation in the condensing region, and hence, gas-liquid separation is not achieved smoothly in the receiver drier 30 due to high quality of the refrigerant induced into the receiver drier 30. Finally, because not only the liquid-phase refrigerant but also the gas-phase refrigerant are induced to the supercooling region of the water-cooled condenser 20, the receiver drier 30 cannot carry out its performance well.

In addition, because the water-cooled condenser 20, the receiver drier 30 and the internal heat exchanger 25 are arranged disorderedly, the package becomes excessively bigger and it is not easy to mount them inside the engine room of the vehicle.

DISCLOSURE

Technical Problem

Accordingly, the present invention has been made in an effort to solve the above-mentioned problems occurring in the prior arts, and it is an object of the present invention to provide an air conditioner system for a vehicle, in which an air-cooled condenser mounted on a refrigerant circulation line between a water-cooled condenser and an expansion valve and a blower fan for blowing air to the air-cooled condenser are arranged on one side of the water-cooled condenser in a state of being disposed in a row in the air flow direction and are arranged within the width of the one side of the water-cooled condenser, thereby enabling the enhancement of installability and assemblability inside an engine room by simplifying and reducing the package, reducing noise of the blower fan and securing adequate cooling performance because of the blower fan disposed between two air-cooled heat exchangers even when inflowing air is insufficient, such as in an idling condition, and securing the original function of the receiver drier and utilizing the air-cooled condenser as a supercooling region to enhance air-conditioning performance because sufficiently liquefied refrigerant is induced into the receiver drier due to installation of the air-cooled condenser.

Technical Solution

To achieve the above objects, the present invention provides an air conditioner system for a vehicle including: a compressor for compressing refrigerant; a water-cooled condenser which exchanges heat between coolant and the refrigerant flowing after being discharged from the compressor to condense the refrigerant; an expansion valve adapted for expanding the refrigerant flowing after being discharged from the water-cooled condenser; an evaporator for evaporating the refrigerant flowing after being discharged from the expansion valve; a refrigerant circulation line which connects the compressor, the water-cooled condenser, the expansion valve and the evaporator with one another in order; an air-cooled condenser which is connected on the refrigerant circulation line between the water-cooled condenser and the expansion valve in order to further cool the refrigerant by exchanging heat between the refrigerant and air; and a blower fan for moving air toward the air-cooled condenser, wherein the air-cooled condenser and the blower fan are mounted to be arranged on one side of the water-cooled condenser in a state where they are arranged in a row in a flow direction of the air and are arranged within a width of one side of the water-cooled condenser.

Advantageous Effects

According to the present invention, because the air-cooled condenser mounted on the refrigerant circulation line between the water-cooled condenser and the expansion valve and the blower fan for blowing air to the air-cooled condenser are arranged on one side of the water-cooled condenser in a state of being disposed in a row in the air flow direction and are arranged within the width of the one side of the water-cooled condenser, the air conditioner system for a vehicle can enhance installability and assemblability inside the engine room by simplifying and reducing the package.

Moreover, the air conditioner system for the vehicle according to the present invention can reduce noise of the blower fan and secure adequate cooling performance because the blower fan is disposed between two air-cooled heat exchangers even when inflowing air is insufficient, such as in an idling condition.

Furthermore, because sufficiently liquefied refrigerant is induced into the receiver drier due to installation of the air-cooled condenser, the air conditioner system for the vehicle according to the present invention can secure the original function of the receiver drier and utilize the air-cooled condenser as a supercooling region to enhance air-conditioning performance.

Additionally, because the air-cooled condenser is mounted at the front side of the water-cooled condenser, the air conditioner system according to the present invention reuses the air passing through the air-cooled condenser to cool the water-cooled condenser, thereby enhancing cooling performance and improving fuel efficiency by reducing power consumption of the compressor.

In addition, because the air-cooled condenser is arranged at the front of the water-cooled condenser, the air conditioner system according to the present invention is easy to construct the package, provides the package in various designs, and enhances installability inside the engine room of the vehicle.

Moreover, because the air-cooled condenser is mounted not at the front side of the vehicle but on the cowl panel to supply the outdoor air of the cowl panel to the air-cooled condenser, thereby simplifying and reducing the package of the entire air conditioner system, reducing the refrigerant amount and manufacturing costs by making the refrigerant circulation line short, and enhancing air-conditioning performance by effectively supplying air to the air-cooled condenser.

Furthermore, because the air-cooled condenser is mounted on the cowl panel of the vehicle, the air-cooled condenser can escape the influence of the high-temperature air of the engine room which flows backward toward the front side of the vehicle at the time of idling of the vehicle, thereby lowering temperature of the air induced into the air-cooled condenser and enhancing air-conditioning performance.

Additionally, because the air-cooled condenser is connected to the outlet of the water-cooled condenser, the air conditioner system according to the present invention further cool the refrigerant inside the air-cooled condenser even though temperature of the refrigerant rises due to temperature rise of the coolant supplied to the water-cooled condenser, thereby enhancing air-conditioning performance.

MODE FOR INVENTION

Figure 1:
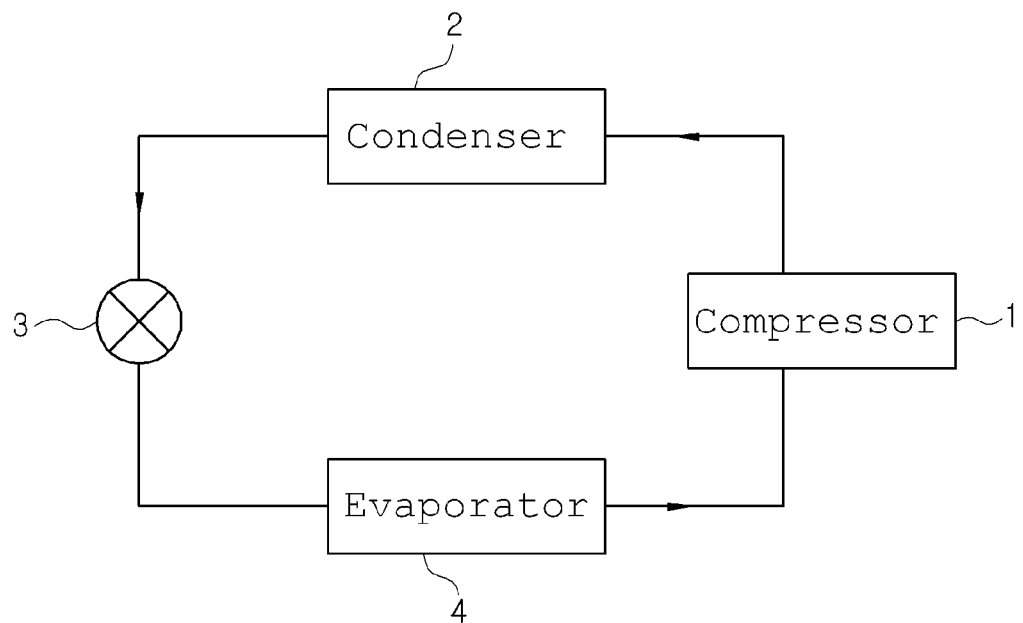
FIG. 1 is a configurative diagram of a general air conditioner system for a vehicle.
Figure 2:
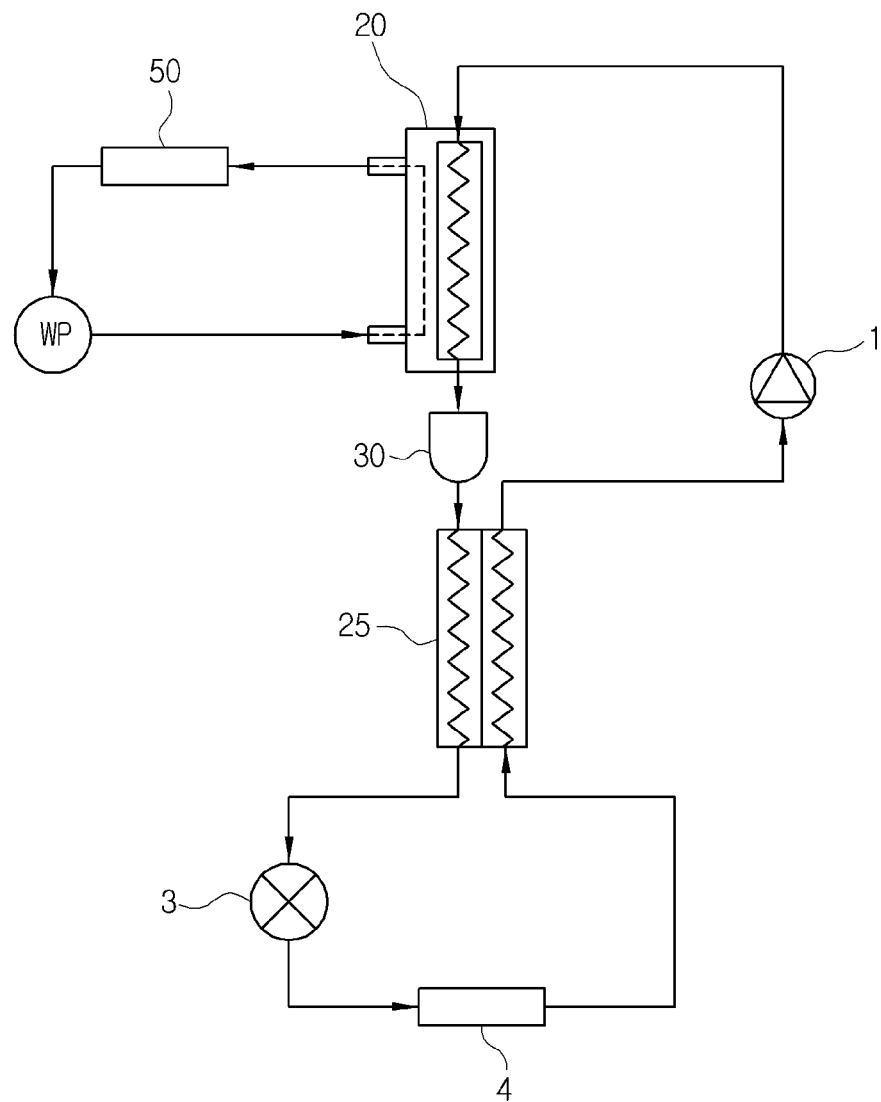
FIG. 2 is a configurative diagram showing a state where a water-cooled condenser, receiver drier and an internal heat exchanger are applied to a conventional air conditioner system for a vehicle.

Reference will be now made in detail to the preferred embodiment of the present invention with reference to the attached drawings.

As shown in the drawings, an air-conditioner system for a vehicle according to a first preferred embodiment of the present invention is configured of a compressor 100, a water-cooled condenser 110, an expansion valve 140 and an evaporator 150 which are connected to a refrigerant pipe P in order, and includes an air-cooled condenser 120, a receiver drier 160 and an internal heat exchanger 130 mounted between the water-cooled condenser 110 and the expansion valve 140 in the above-mentioned system.

First, the compressor 100 inhales and compresses gas-phase refrigerant of low-temperature and low-pressure discharged from the evaporator 150 and discharges the gas-phase refrigerant into a gaseous state of high-temperature and high-pressure while receiving a driving power from a driving power supply source, such as, an engine or a motor.

The water-cooled condenser 110 exchanges heat between the gas-phase refrigerant of high-temperature and high-pressure, which flows after being discharged from the compressor 100, and coolant, and then, condenses the refrigerant into liquid-phase refrigerant and discharges the condensed refrigerant.

The water-cooled condenser 110 includes: a refrigerant flow channel 111 in which the refrigerant discharged from the compressor 100 flows; and a coolant flow channel 112 in which coolant circulating a water-cooled radiator 200 mounted inside a vehicle engine room flows, and the refrigerant flow channel 111 and the coolant flow channel 112 are configured to be able to exchange heat with each other.

That is, the water-cooled condenser 110 may be a plate-type heat exchanger (not shown) with laminated plates. In case of the plate-type heat exchanger, a plurality of coolant flow channels 112 and a plurality of refrigerant flow channels 111 are arranged by turns to exchange heat with each other.

The water-cooled condenser 110 is mounted adjacent to a partition wall 300 which partitions an engine room of the vehicle and the inside of the vehicle.

In the meantime, the water-cooled condenser 110 may have one of various well-known forms. For example, the water-cooled condenser 110 may be configured such that the coolant flow channel 112 is formed in a tank type and the refrigerant flow channel 111 is mounted inside the coolant flow channel 112 to be able to exchange heat with each other.

The water-cooled radiator 200 is connected with the coolant flow channel 112 of the water-cooled condenser 110 through a coolant pipe 205, and a water pump 210 for circulating the coolant is mounted on the coolant pipe 205.

Therefore, when the water pump 210 is operated, the coolant circulating in the coolant pipe 205 is cooled by heat exchange with air while passing through the water-cooled radiator 200, and then, the cooled coolant is supplied to the coolant flow channel 112 of the water-cooled condenser 110 to exchange heat with the refrigerant flowing in the refrigerant flow channel 111 of the water-cooled condenser 110.

In the meantime, the water-cooled radiator 200 is used to cool electronic units of the vehicle, such as a battery, an inverter, a motor and so on, by exchanging heat between the air and the coolant flowing in the water-cooled radiator 200.

Moreover, the expansion valve 140 rapidly expands the liquid-phase refrigerant, which flows after being discharged from the water-cooled condenser 110, by the throttling action and sends the refrigerant to the evaporator 150 in a wet-saturated state of low-temperature and low-pressure.

In other words, the liquid-phase refrigerant discharged from the water-cooled condenser 110 passes the air-cooled condenser 120, the receiver drier 160 and the internal heat exchanger 130 in order, and then, is supplied to the expansion valve 140 to be expanded.

In the meantime, in a case that the receiver drier 160 is mounted at the front of the air-cooled condenser 120, the liquid-phase refrigerant discharged from the water-cooled condenser 110 passes through the receiver drier 160, the air-cooled condenser 120 and the internal heat exchanger 130 in order, and then, is supplied to the expansion valve 140 to be expanded.

The evaporator 150 evaporates the liquid-phase refrigerant of low-pressure, which flows after being discharged from the expansion valve 140, by heat-exchanging with the air blown to the interior of the vehicle inside an air-conditioning case 155 so that the air discharged to the interior of the vehicle is cooled due to heat absorption by evaporative latent heat of the refrigerant.

Continuously, the gas-phase refrigerant of low-temperature and low-pressure evaporated and discharged in the evaporator 150 is inhaled to the compressor 100 again, and then, recirculates the refrigerant cycle as described above.

Furthermore, in the refrigerant circulation process, the air blown by a blower (not shown) flows into the air-conditioning case 155, and is cooled by evaporative latent heat of the liquid-phase refrigerant circulating the inside of the evaporator 150 while passing the evaporator 150. Therefore, the interior of the vehicle is cooled when the refrigerant in the cooled state is discharged to the interior of the vehicle.

Additionally, the air-cooled condenser 120 which exchanges heat between the refrigerant and the air to additionally cool the refrigerant and a blower fan 125 which moves the air toward the air-cooled condenser 120 are mounted on the refrigerant circulation line (R) between the water-cooled condenser 110 and the expansion valve 140.

In the meantime, the receiver drier 160 which separates the refrigerant into gas-phase refrigerant and liquid-phase refrigerant and stores the liquid-phase refrigerant may be connected to the refrigerant circulation line (R) which connects a condensing region 120*a* and a supercooling region 120*b* of the air-cooled condenser 120 or may be connected to the refrigerant circulation line (R) which connects two air-cooled condensers 120.

Figure 9:
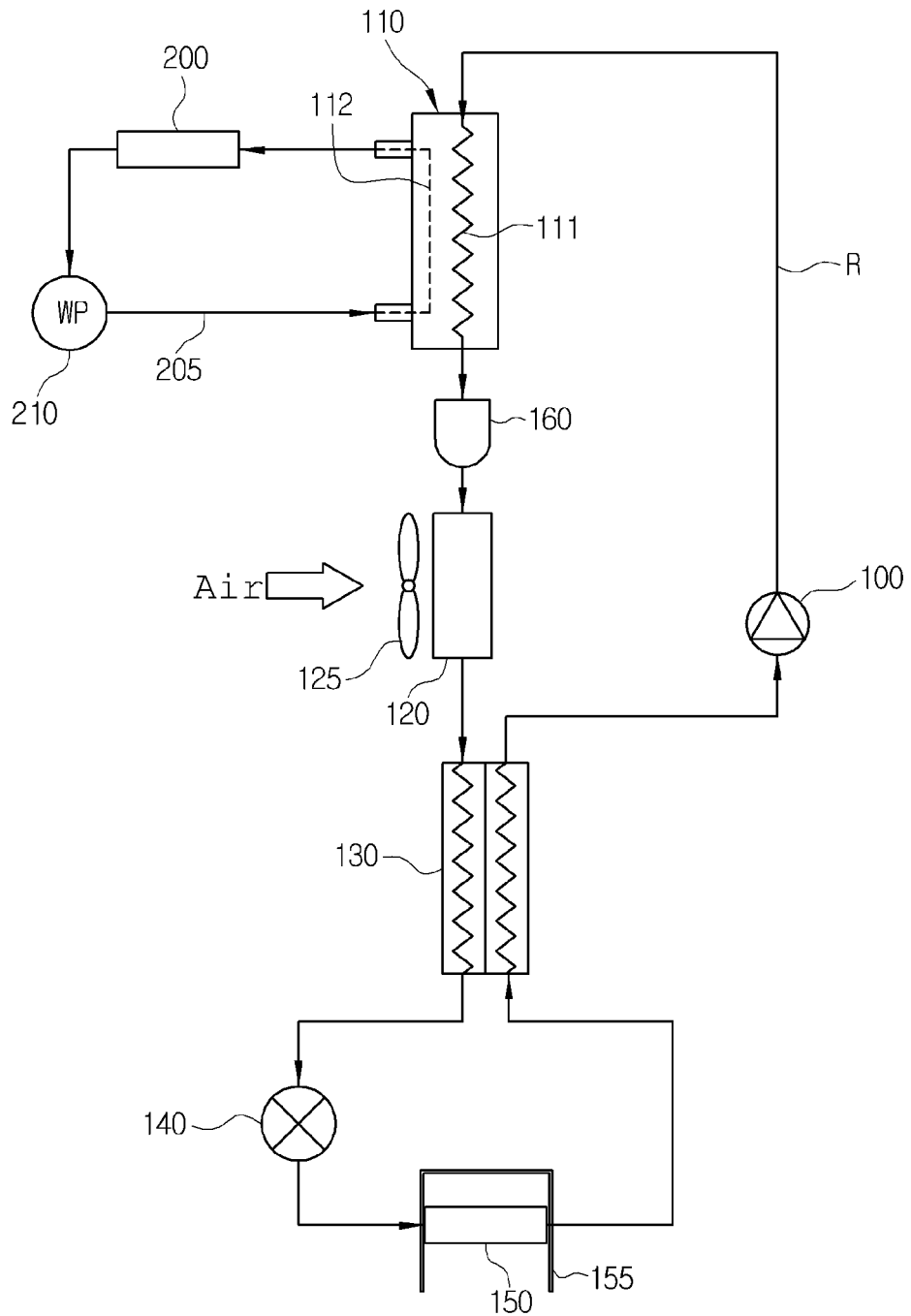
FIG. 9 is a configurative diagram of an air conditioner system for a vehicle according to a third preferred embodiment of the present invention.

Of course, as shown in FIG. 9, the receiver drier 160 may be mounted on the refrigerant circulation line between the water-cooled condenser 110 and the air-cooled condenser 120.

However, the air-cooled condenser 120 and the blower fan 125 are arranged and mounted on one side of the water-cooled condenser 110 in a state where they are arranged in a row in the air flow direction, and are mounted to be arranged within a width (W) of one side of the water-cooled condenser 110.

Figure 4:
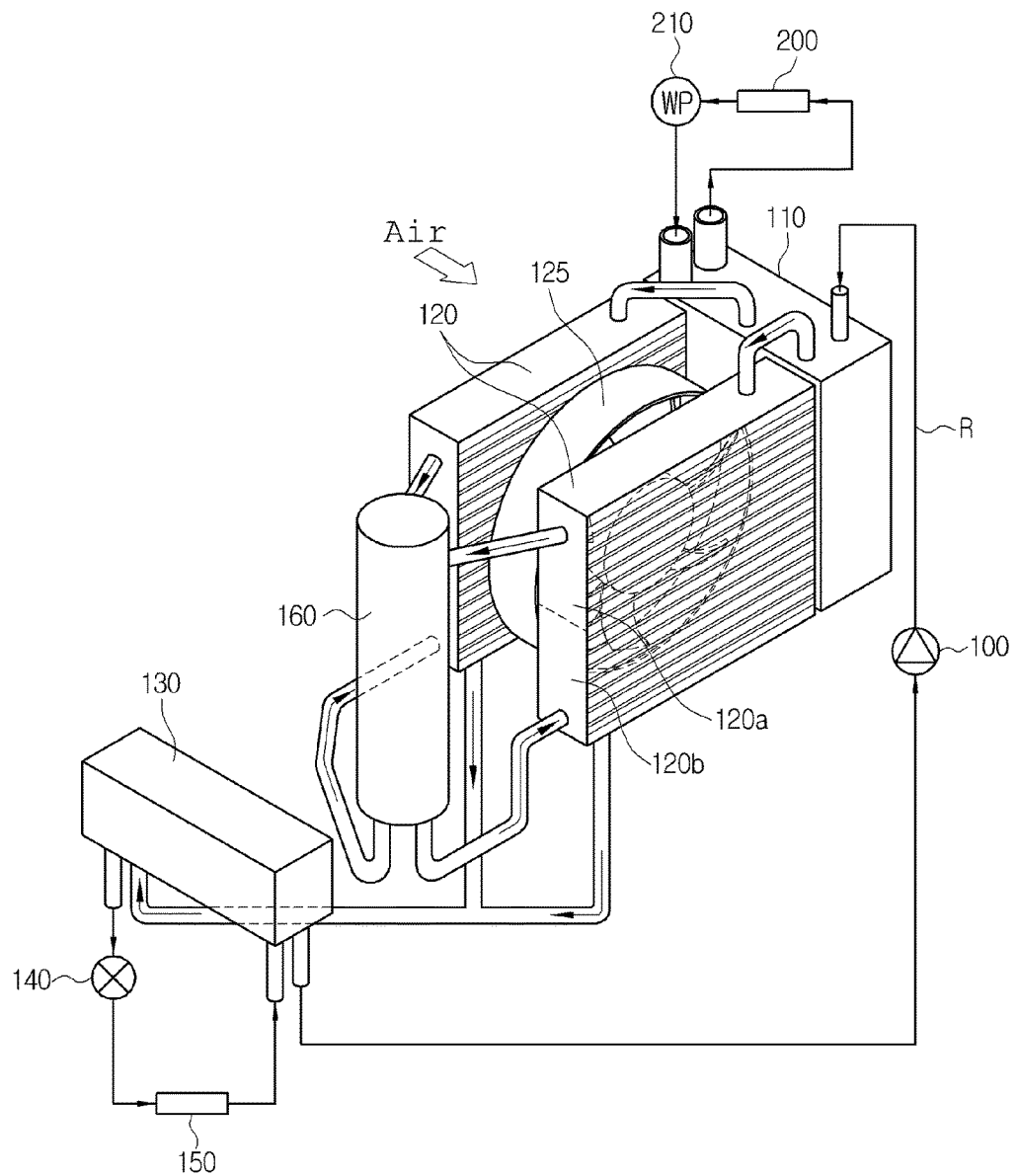
FIG. 4 is a perspective view of the air conditioner system for the vehicle according to the first preferred embodiment of the present invention.
Figure 5:
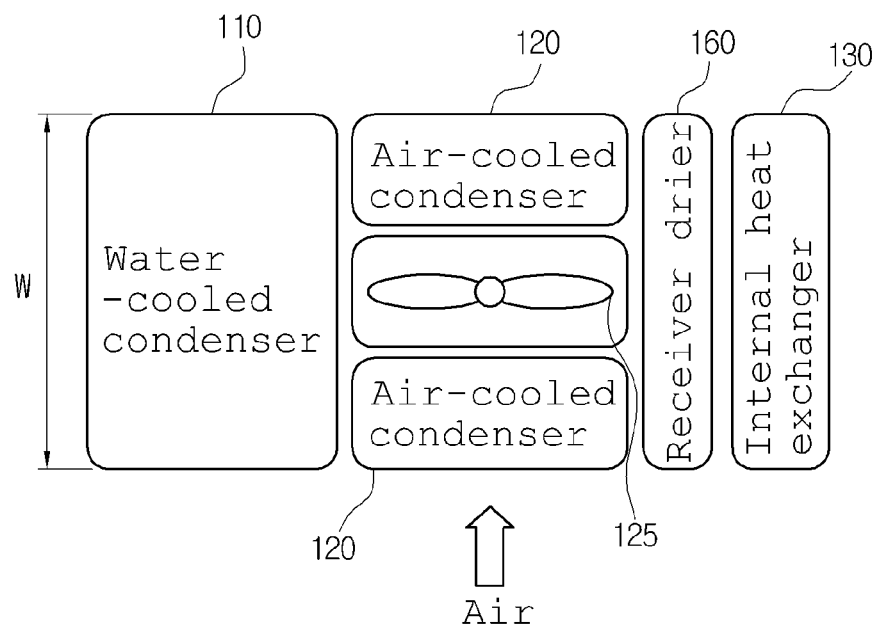
FIG. 5 is an arrangement diagram of essential parts of the air conditioner system for the vehicle according to the first preferred embodiment of the present invention.
Figure 6:
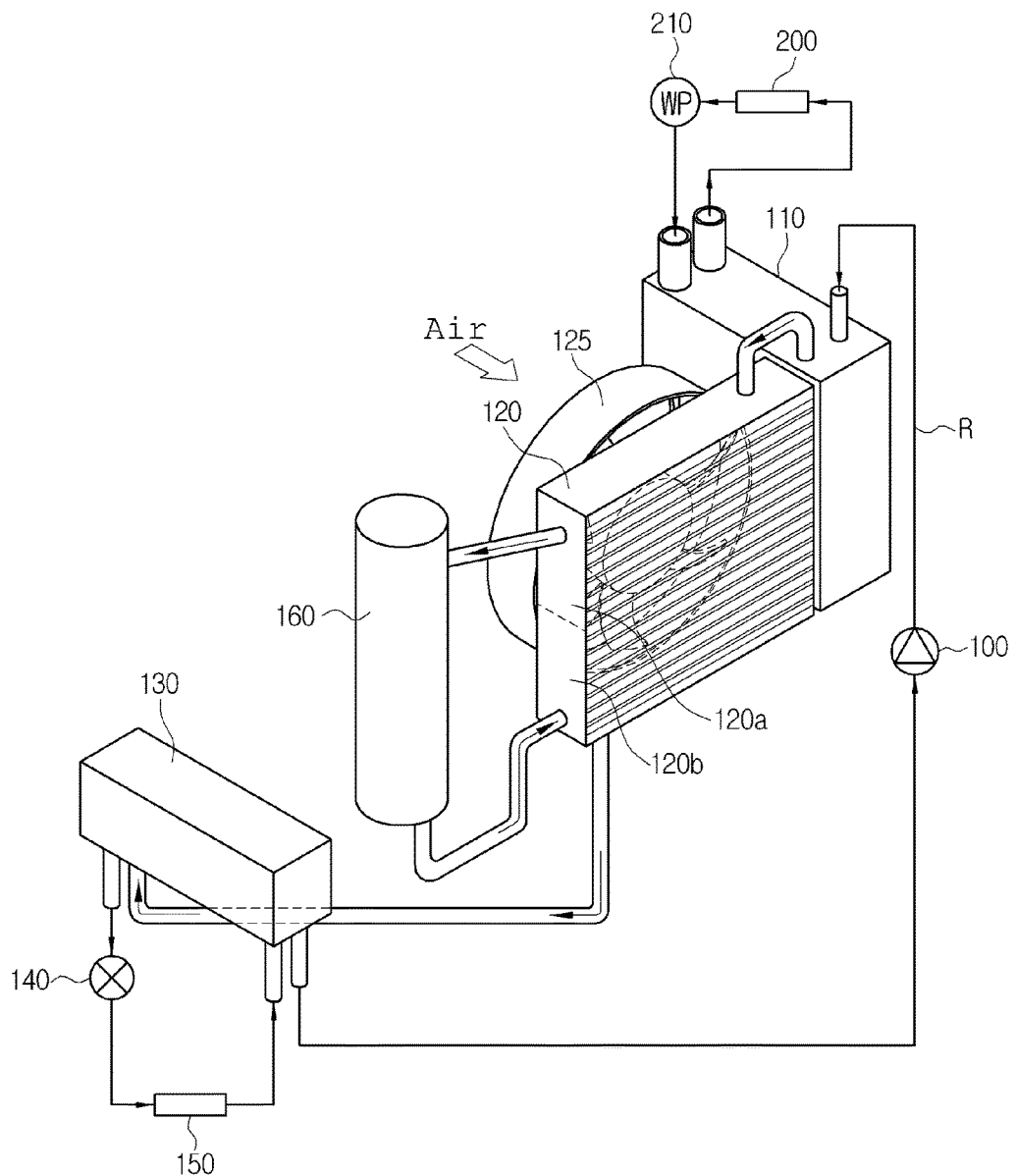
FIG. 6 is a perspective view showing a state where one air-cooled condenser is mounted in FIG. 4.
Figure 7:
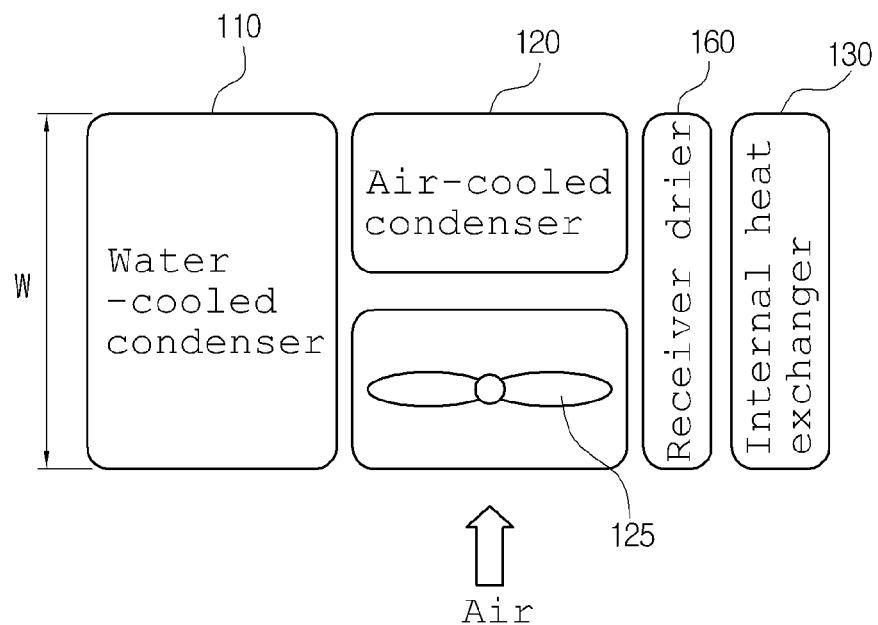
FIG. 7 is an arrangement diagram showing essential parts of FIG. 6.

In this instance, one air-cooled condenser 120 and one blower fan 125 may be mounted on one side of the water-cooled condenser 110 as shown in FIGS. 6 and 7 or two air-cooled condensers 120 and one blower fan 125 may be mounted on one side of the water-cooled condenser 110 as shown in FIGS. 4 and 5.

In the case that the two air-cooled condensers 120 are mounted, they are mounted to be spaced apart from each other at a predetermined interval in the air flow direction of the air passing through the air-cooled condenser 120, and the blower fan 125 is mounted between the two air-cooled condensers 120.

That is, the blower fan 125 is not externally mounted but is internally mounted between the two air-cooled condensers 120, thereby reducing noise of the blower fan 125, cooling the two air-cooled condensers 120 with the one blower fan 125, and reducing the total package size.

Meanwhile, in the case that the one air-cooled condenser 120 is mounted, as shown in FIGS. 6 and 7, it is preferable that the blower fan 125 be mounted above the air-cooled condenser 120 in the air flow direction of the air passing through the air-cooled condenser 120.

As described above, because the air-cooled condenser 120 and the blower fan 125 are disposed within the width (W) of the water-cooled condenser 110, the air conditioner system according to the present invention enables enhancement of installability and assemblability inside an engine room by simplifying and reducing the package. Moreover, because the blower fan 125 is arranged between the two air-cooled heat exchangers 120, the air conditioner system according to the present invention can reduce noise of the blower fan 125 and secure adequate cooling performance even though inflowing air is insufficient under an idling condition.

In the meantime, the width (W) of the water-cooled condenser 110 is the sum of the width of the air-cooled condenser 120 and the width of the blower fan 125.

Here, the width (W) of the water-cooled condenser 110 is the width (W) of the water-cooled condenser 110 in the air flow direction of the air passing through the air-cooled condenser 120, and the width of the air-cooled condenser 120 is the sum of two air-cooled condensers 120 in the case that the air-cooled condensers 120 are mounted.

Moreover, in the case that the two air-cooled condensers 120 are mounted, the refrigerant discharged from the water-cooled condenser 110 is simultaneously supplied to the two air-cooled condensers 120.

Furthermore, the receiver drier 160 which separates the refrigerant circulating the refrigerant circulation line (R) into gas-phase refrigerant and liquid-phase refrigerant and stores the liquid-phase refrigerant is arranged on one side of the air-cooled condenser 120.

Additionally, the air-cooled condenser 120 includes: a condensing region 120*a* which exchanges heat between the refrigerant and the air; and a supercooling region 120*b* which reexchanges heat between the refrigerant passing the condensing region 120*a* and the air.

Now, the structure of the air-cooled condenser 120 will be described in brief. The air-cooled condenser 120 includes: a pair of header tanks spaced apart from each other at a predetermined interval and mounted side by side; a plurality of tubes of which both end portions are joined to the header tanks to communicate the header tanks with each other; and a radiation fin interposed between the tubes.

In order to divide the air-cooled condenser 120 into the condensing region 120*a* and the supercooling region 120*b*, a baffle is disposed inside the header tank to divide the inside of the header tank into an upper part and a lower part.

In the meantime, the water-cooled condenser 110 is connected with the condensing region 120*a* of the air-cooled condenser 120.

Moreover, an inlet of the receiver drier 160 is connected with the condensing region 120*a* of the air-cooled condenser 120 and an outlet is connected with the supercooling region 120*b* of the air-cooled condenser 120, so that the refrigerant condensed in the water-cooled condenser 110 is condensed in the condensing region 120*a* of the air-cooled condenser 120 again and is supercooled in the supercooling region 120*b* of the air-cooled condenser 120 after passing through the receiver drier 160.

As described above, after the refrigerant sufficiently condensed in the water-cooled condenser 110 is cooled in the condensing region 120*a* of the air-cooled condenser 120 again, the refrigerant is supplied to the receiver drier 160. The sufficiently liquefied refrigerant is supplied to the receiver drier 160 so that the receiver drier 160 secures its original function, thereby discharging only the liquid-phase refrigerant to the downstream side (outlet side) of the receiver drier 160, and reducing discharge pressure of the compressor 100 and reducing power consumption of an air conditioner because the system is filled with an adequate refrigerant amount according to the system capacity.

Furthermore, because the air-cooled condenser 120 can be utilized as the supercooling region, temperature of the refrigerant lowers further so that the refrigerant can flow into the internal heat exchanger 130 to enhance cooling performance. In this instance, because temperature of the refrigerant flowing into the compressor 100 also drops, the air conditioner system according to the present invention can prevent a temperature rise of the refrigerant discharged from the compressor 100 and enhance durability and stability of the system.

In the meantime, when the vehicle idles or when the outdoor temperature rises, temperature of the coolant circulating the water-cooled radiator 200 also rises. The coolant with elevated temperature is supplied to the water-cooled condenser 110 so that temperature of the refrigerant flowing in the water-cooled condenser 110 rises.

In the present invention, the air-cooled condenser 120 is mounted at the downstream side of the refrigerant flow direction of the water-cooled condenser 110 in order to further cool the refrigerant by the air-cooled condenser 120 even though temperature of the refrigerant flowing in the water-cooled condenser 110 rises. Accordingly, because temperature of the refrigerant lowers further, the refrigerant can flow into the internal heat exchanger 130 to enhance cooling performance. Consequentially, because temperature of the refrigerant induced into the compressor 100 also drops, the air conditioner system according to the present invention can prevent a temperature rise of the refrigerant discharged from the compressor 100.

Meanwhile, the receiver drier 160 serves to separate the refrigerant discharged from the condensing region 120*a* of the air-cooled condenser 120 into gas-phase refrigerant and liquid-phase refrigerant and store the liquid-phase refrigerant. That is, the receiver drier 160 enhances cooling efficiency by separating the gas-phase refrigerant which is not liquefied in the condensing region 120*a* of the air-cooled condenser 120 or by absorbing moisture contained in the refrigerant.

Therefore, a desiccant (not shown) is disposed inside the receiver drier 160 in order to remove the gas-phase refrigerant and moisture. Of course, a filter (not shown) may be mounted to remove impurities contained in the refrigerant passing through the desiccant.

In the meantime, the air-cooled condenser 120 and the receiver drier 160 may be formed separately from each other or formed integrally.

Additionally, the internal heat exchanger 130 which exchanges heat between the refrigerant discharged from the air-cooled condenser 120 and the refrigerant discharged from the evaporator 150 is mounted on the refrigerant circulation line (R) between the air-cooled condenser 120 and the expansion valve 140.

In this instance, the internal heat exchanger 130 is arranged on one side of the receiver drier 160. Hence, the water-cooled condenser 110, the air-cooled condenser 120, the blower fan 125, the receiver drier 160 and the internal heat exchanger 130 are arranged in a row.

The internal heat exchanger 130 is a heat exchanger for refrigerant-to-refrigerant heat exchange. FIG. 4 is a schematic diagram of the internal heat exchanger 130, and the internal heat exchanger 130 may be a plate type heat exchanger or a dual tube type heat exchanger.

Therefore, while flowing in the internal heat exchanger 130, the refrigerant passing through the air-cooled condenser 120 exchanges heat with the refrigerant of low temperature, which is discharged from the evaporator 150 and flows in the internal heat exchanger 130, so as to be further supercooled. After that, the supercooled refrigerant induced into the expansion valve 140. As described above, when temperature of the refrigerant gets lower, it increases an enthalpy difference of the evaporator 150 to enhance air-conditioning performance.

Moreover, because temperature of the refrigerant which passes the internal heat exchanger 130 and is induced into the compressor 100 after being discharged from the evaporator 150 also gets lower, temperature of the refrigerant discharged from the compressor 100 does not exceed the upper limit.

Figure 3:
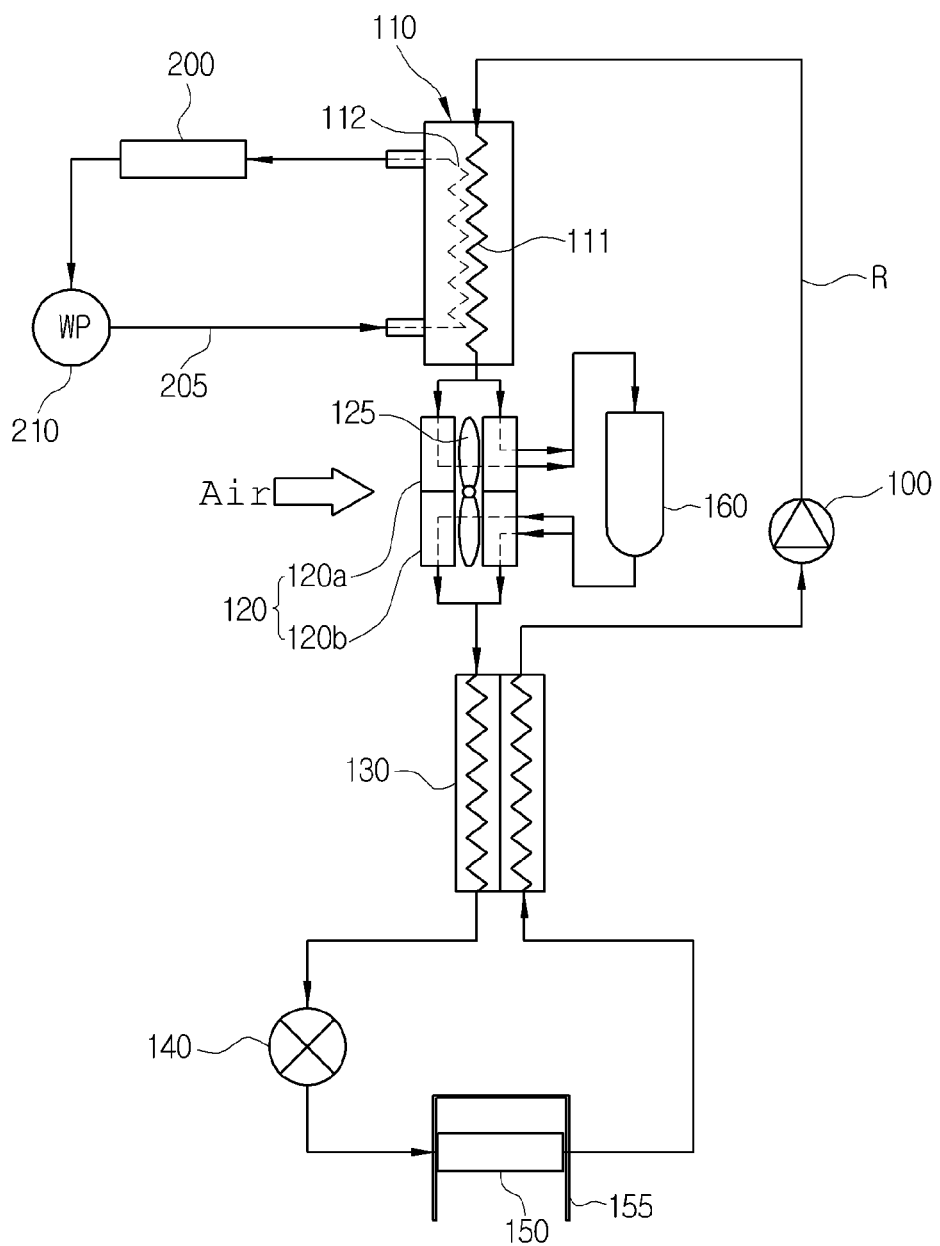
FIG. 3 is a configurative diagram of an air conditioner system for a vehicle according to a first preferred embodiment of the present invention.

Hereinafter, the refrigerant flowing process of the air conditioner system for the vehicle according to the first preferred embodiment of the present invention will be described, and as shown in FIGS. 3 and 4, the example that two air-cooled condensers 120 are mounted will be described.

First, the gas-phase refrigerant of high-temperature and high-pressure compressed and discharged in the compressor 100 flows into the refrigerant heat-exchanging part 111 of the water-cooled condenser 110.

The gas-phase refrigerant flowing into the refrigerant flow channel 111 of the water-cooled condenser 110 exchanges heat with coolant flowing into the coolant flow channel 112 of the water-cooled condenser 110 while circulating in the water-cooled radiator 200, and in the above process, the refrigerant is cooled and changed into a liquid phase.

The liquid-phase refrigerant discharged from the water-cooled condenser 110 is cooled once more through heat exchange with the air while flowing in the condensing regions 120*a* of the two air-cooled condensers 120 so as to be condensed again, and in the case that one air-cooled condenser is mounted as shown in FIG. 6, the liquid-phase refrigerant is condensed while flowing in the condensing region of the one air-cooled condenser. The condensed liquid-phase refrigerant is induced into the receiver drier 160.

The gas-phase refrigerant contained in the liquid-phase refrigerant is separated in the receiver drier 160 so that the liquid-phase refrigerant is located below and the gas-phase refrigerant is located above inside the receiver drier 160.

Continuously, the liquid-phase refrigerant discharged from the receiver drier 160 is induced into the supercooling region 120*b* of the two air-cooled condensers 120 to be cooled further (supercooled) through heat exchange with the air, and then, is induced into the internal heat exchanger 130.

The refrigerant flowing into the internal heat exchanger 130 is further supercooled while exchanging heat with the refrigerant flowing in the internal heat exchanger 130, and then, flows into the expansion valve 140 to be decompressed and expanded.

The refrigerant decompressed and expanded in the expansion valve 140 becomes into an atomized state of low-temperature and low-pressure and flows into the evaporator 150. The refrigerant flowing into the evaporator 150 is evaporated through heat exchange with the air blown to the interior of the vehicle, and at the same time, cools the air blown to the interior of the vehicle due to heat absorption due to evaporative latent heat of the refrigerant.

After that, the refrigerant of low-temperature and low-pressure discharged from the evaporator 150 flows into the internal heat exchanger 130. In this instance, the refrigerant exchanges heat with the refrigerant which is discharged from the air-cooled condenser 120 and flows in the internal heat exchanger 130. After that, the refrigerant flows into the compressor 100, and then, recirculates the refrigeration cycle as described above.

Figure 8:
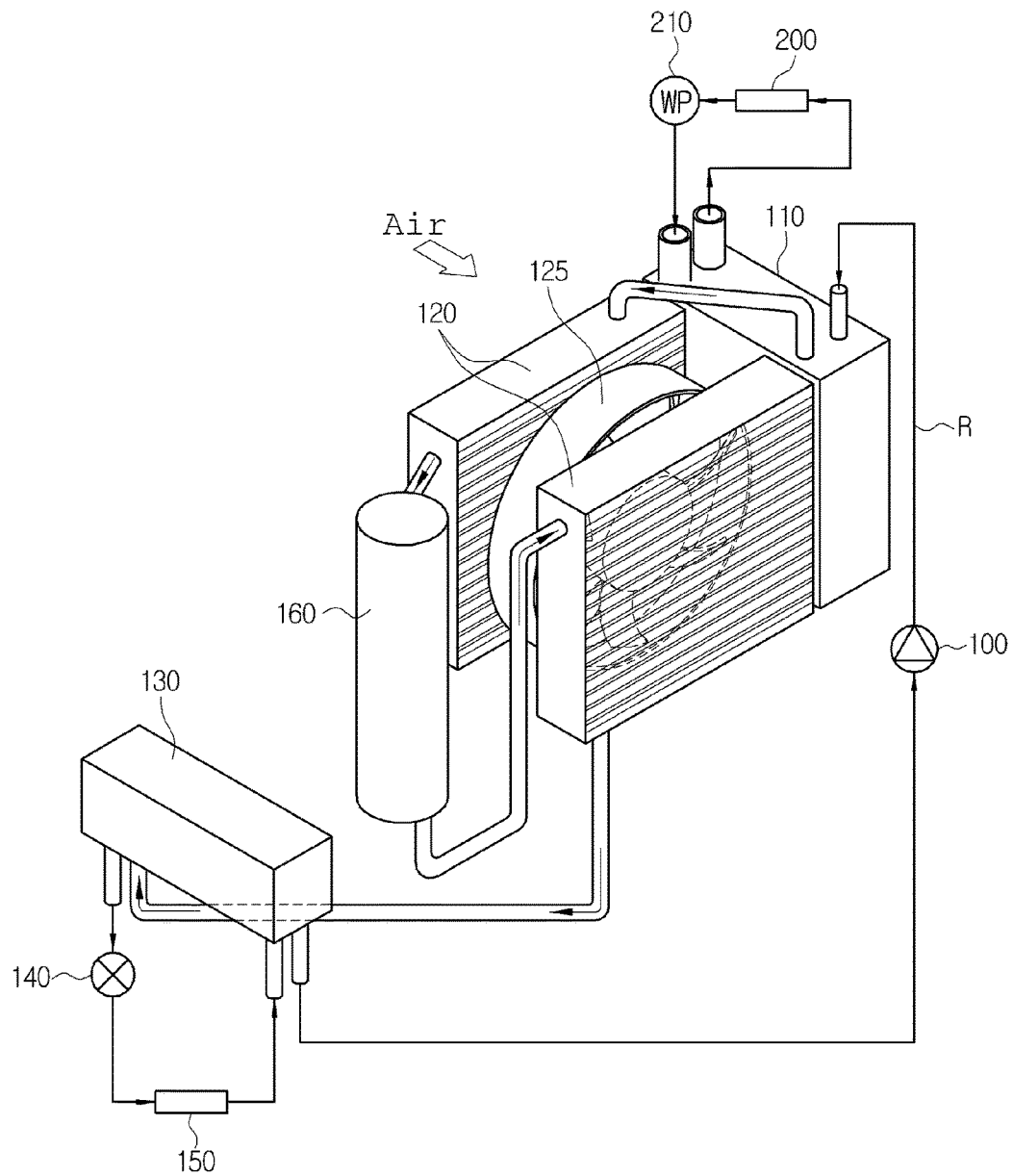
FIG. 8 is a configurative diagram of an air conditioner system for a vehicle according to a second preferred embodiment of the present invention.

FIG. 8 illustrates an air conditioner system for a vehicle according to a second preferred embodiment of the present invention, and only parts which are different from the parts of the first preferred embodiment will be described. Also, in the second preferred embodiment, two air-cooled condensers 120 are mounted, but the entire of one air-cooled condenser 120 becomes a condensing region and the entire of the other one becomes a supercooling region.

In this instance, an inlet of a receiver drier 160 is connected with one of the two air-cooled condensers 120, and an outlet of the receiver drier 160 is connected with the other air-cooled condenser 120.

Therefore, liquid-phase refrigerant discharged after exchanging heat with coolant in a water-cooled condenser 110 is induced into one of the air-cooled condenser 120 and is cooled once more through heat exchange with the air to be condensed again, and then, the condensed liquid-phase refrigerant is induced into the receiver drier 160.

The gas-phase refrigerant contained in the liquid-phase refrigerant is separated in the receiver drier 160 so that the liquid-phase refrigerant is located below and the gas-phase refrigerant is located above inside the receiver drier 160.

Continuously, the liquid-phase refrigerant discharged from the receiver drier 160 is induced into the other air-cooled condenser 120 to be further cooled (supercooled) through heat exchange with the air, and then, is induced into the internal heat exchanger 130. The following steps of the refrigerant flow process is the same as the first preferred embodiment.

FIGS. 9 to 12 illustrate an air conditioner system for a vehicle according to a third preferred embodiment of the present invention, and only parts which are different from the parts of the first and second preferred embodiments will be described.

In the third preferred embodiment, a receiver drier 160, an air-cooled condenser 120 and an internal heat exchanger 130 are mounted on a refrigerant circulation line (R) to be connected in order in the refrigerant flow direction.

In this instance, an inlet of the receiver drier 160 is connected with the water-cooled condenser 110 and an outlet of the receiver drier 160 is connected with the air-cooled condenser 120 so that refrigerant condensed in the water-cooled condenser 110 is supercooled in the air-cooled condenser 120 after passing through the receiver drier 160.

Figure 10:
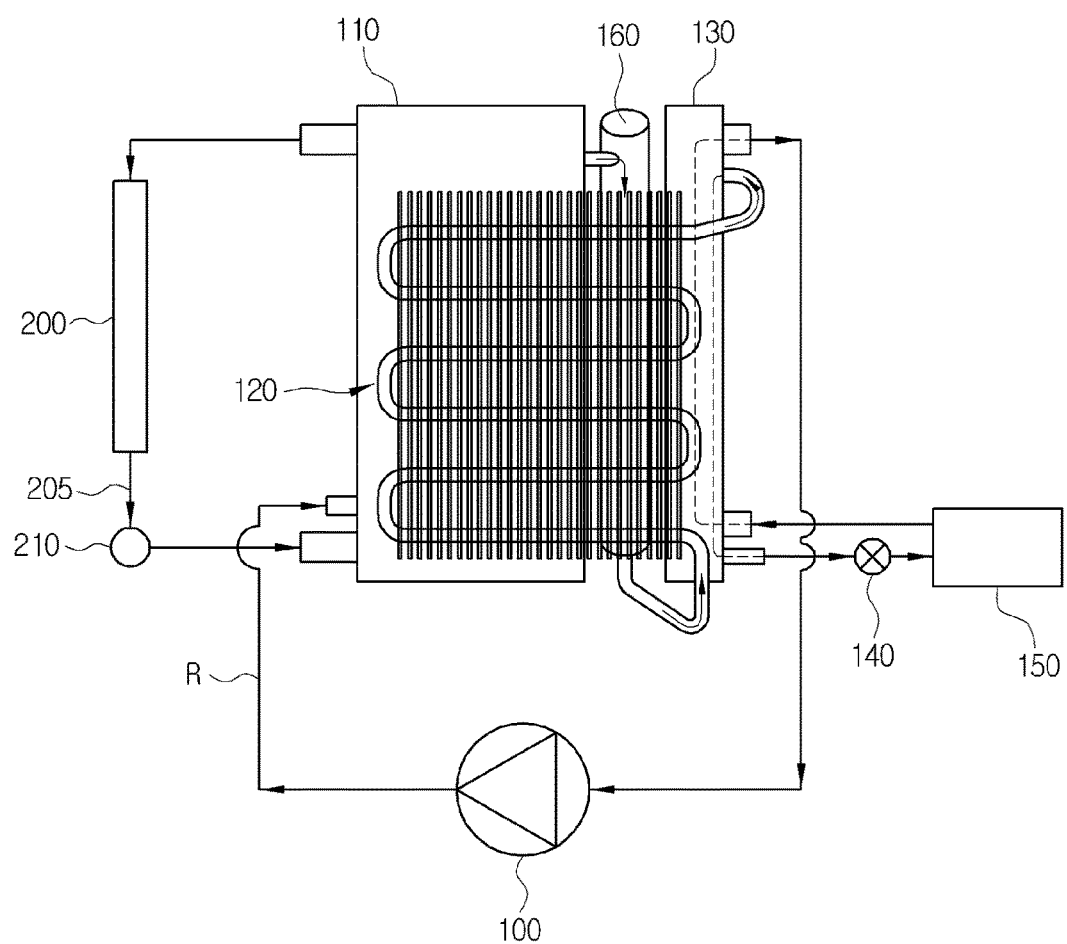
FIG. 10 is a detail diagram of a water-cooled condenser, a receiver drier, an air-cooled condenser and an internal heat exchanger of FIG. 9.
Figure 11:
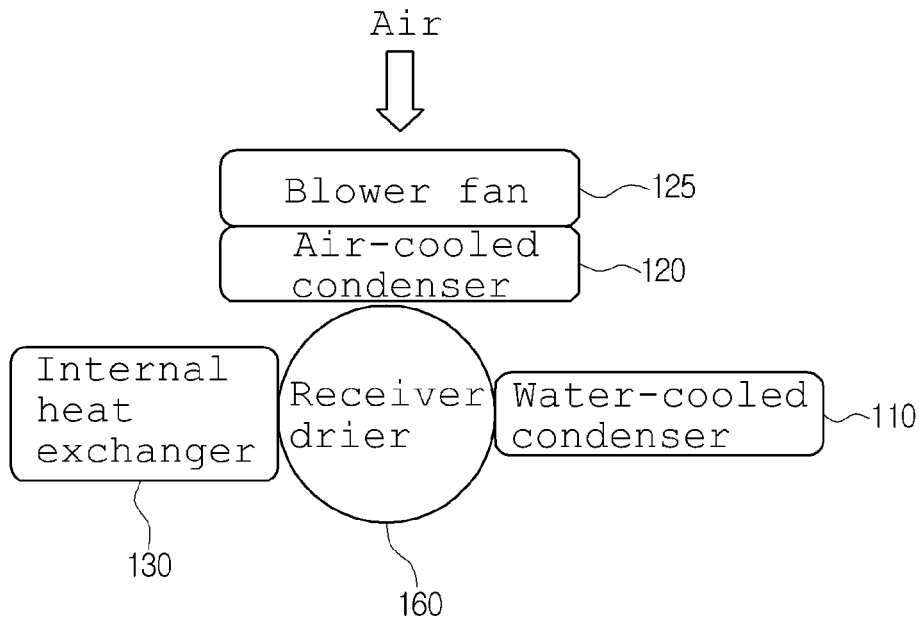
FIG. 11 is an arrangement diagram of essential parts of the air conditioner system for the vehicle according to the third preferred embodiment of the present invention.
Figure 12:
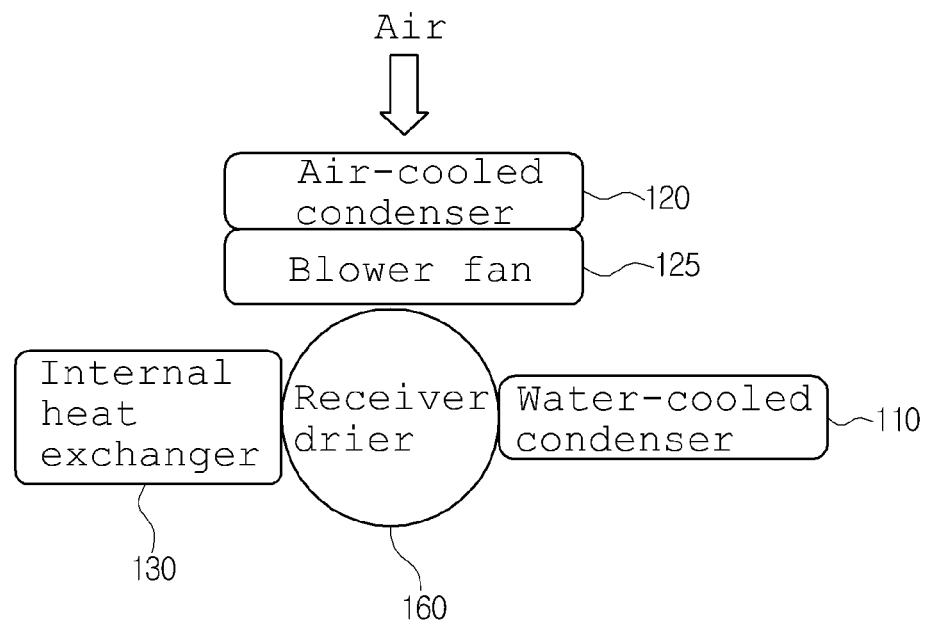
FIG. 12 is an arrangement diagram showing a state where a blower fan is arranged between the air-cooled condenser and the water-cooled condenser in FIG. 11.
Figure 13:
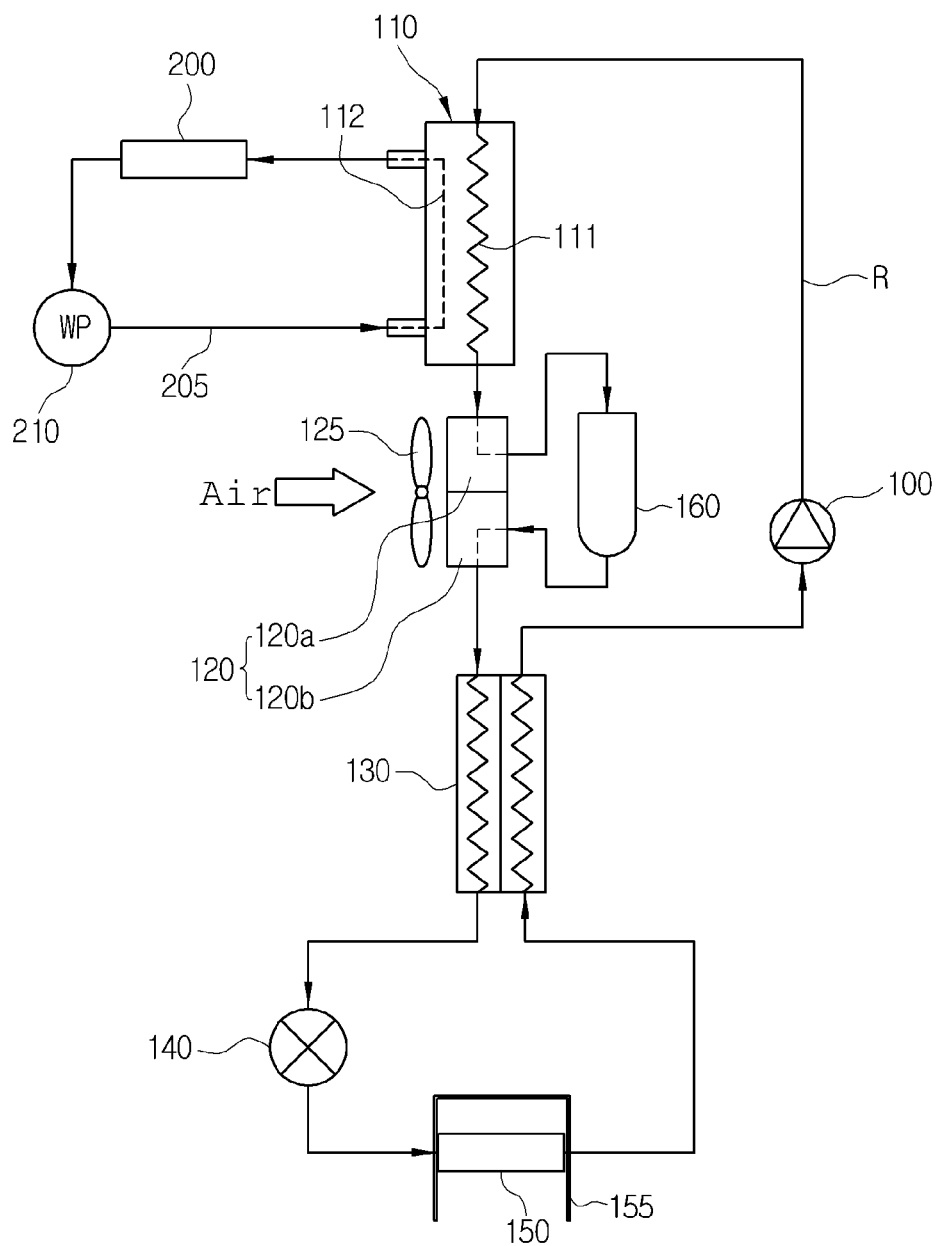
FIG. 13 is a configurative diagram of an air conditioner system for a vehicle according to a fourth preferred embodiment of the present invention.

The receiver drier 160 is arranged at the left or the right of the water-cooled condenser 110, and in FIG. 10, the receiver drier 160 is arranged at the right of the water-cooled condenser 110.

In this instance, the receiver drier 160 may be mounted integrally with the water-cooled condenser 110.

The air-cooled condenser 120 is arranged such that the air passing through the air-cooled condenser 120 faces the water-cooled condenser 110. Therefore, the air passing through the air-cooled condenser 120 is reused to cool the water-cooled condenser 110. For this, he air-cooled condenser 120 is arranged and mounted in front of the water-cooled condenser 110.

In this instance, the air-cooled condenser 120 is arranged in a row with the water-cooled condenser 110 in the air flow direction of the air passing through the air-cooled condenser 120 and is spaced apart from the water-cooled condenser 110 at a predetermined interval.

Therefore, the air passing through the air-cooled condenser 120 flows to the water-cooled condenser 110 and cools the water-cooled condenser 110 while flowing along the front surface of the water-cooled condenser 110 so as to enhance cooling performance.

Figure 15:
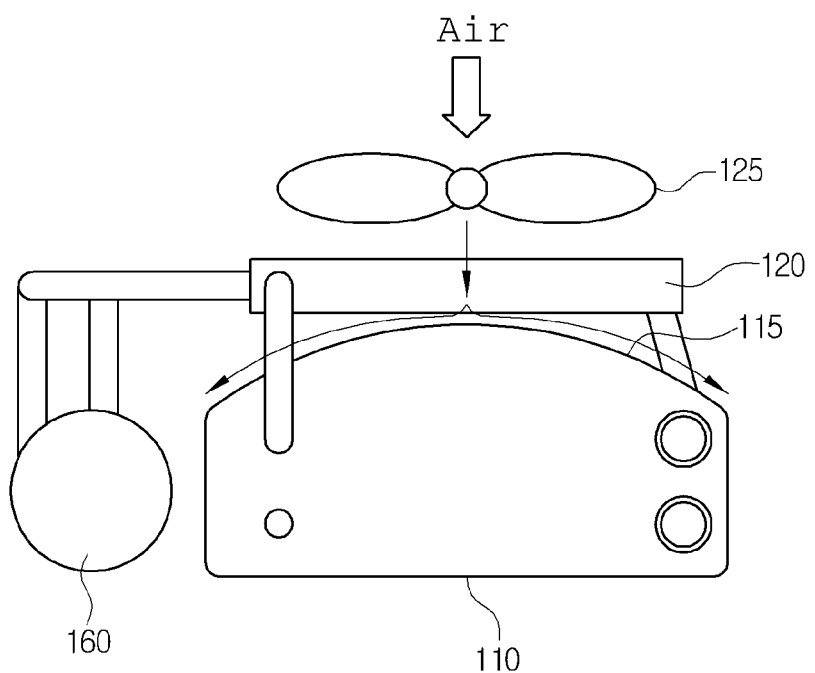
FIG. 15 is a plan view of FIG. 14.
Figure 16:
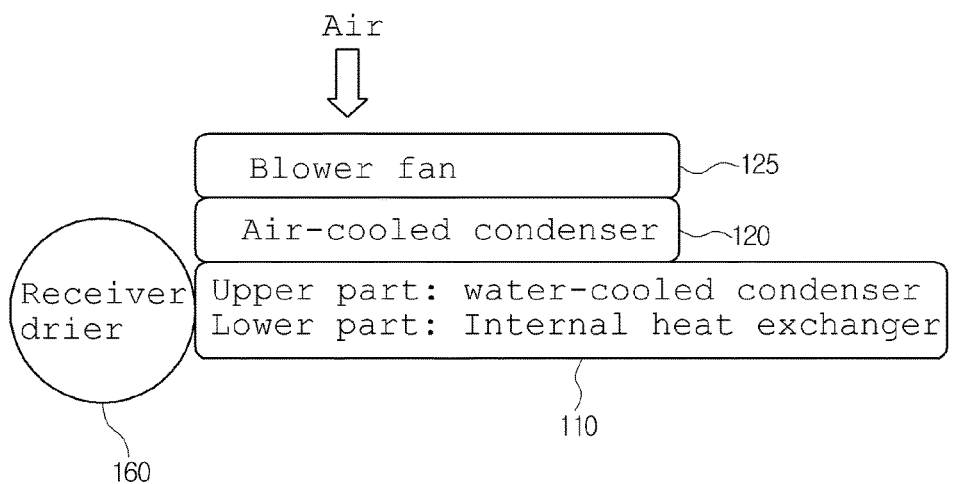
FIG. 16 is an arrangement diagram of essential parts of the air conditioner system for the vehicle according to the fourth preferred embodiment of the present invention.
Figure 17:
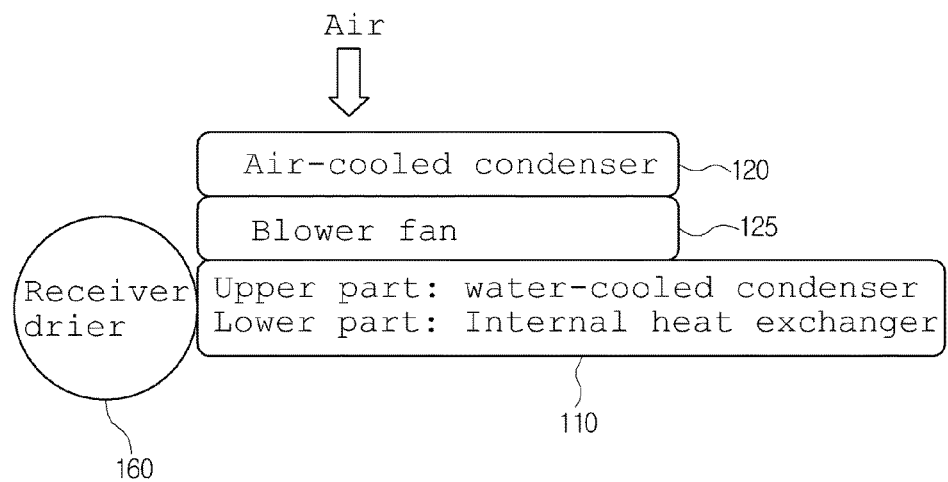
FIG. 17 is an arrangement diagram showing a state where a blower fan is arranged between an air-cooled condenser and a water-cooled condenser in FIG. 16.

In this instance, as shown in FIG. 15, the front surface of the water-cooled condenser 110 which faces the air-cooled condenser 120 has a curved surface 115 to promote a flow of the air at the front side of the water-cooled condenser 110.

In other words, the air passing through the air-cooled condenser 120 flows to both sides along the curved surface 115 of the water-cooled condenser 110 not to interrupt the flow of the air so that the air flows smoothly.

Moreover, because the front side of the water-cooled condenser 110 has the curved surface 115, heat-exchange performance is enhanced due to an increase of a contact area with the air.

Meanwhile, in the case that the water-cooled condenser 110 is the plate-type heat exchanger, front sides of plates are made in a curved form and the plates having the curved front sides are laminated so that the plate-type heat exchanger (water-cooled heat exchanger) having the curved surface 115 can be manufactured.

Furthermore, a radiation fin (not shown) is mounted on the front side of the water-cooled condenser 110 to enhance heat-exchange efficiency of the water-cooled condenser 110.

Additionally, a blower fan 125 is mounted in front of the air-cooled condenser 120 or mounted between the air-cooled condenser 120 and the water-cooled condenser 110.

In the case that the blower fan 125 is mounted in front of the air-cooled condenser 120, the blower fan 125, the air-cooled condenser 120 and the water-cooled condenser 110 are mounted in a row in the air flow direction of the air passing through the air-cooled condenser 120.

In the case that the blower fan 125 is mounted between the air-cooled condenser 120 and the water-cooled condenser 110, the air-cooled condenser 120, the blower fan 125 and the water-cooled condenser 110 are mounted in a row in the air flow direction of the air passing through the air-cooled condenser 120.

As described above, because the blower fan 125 is mounted in front of the air-cooled condenser 120 or mounted between the air-cooled condenser 120 and the water-cooled condenser 110, air can be induced sufficiently even when inflowing air is insufficient, such as in an idling condition, so as to secure sufficient cooling performance.

In the meantime, the air-cooled condenser 120 exchanges heat between the refrigerant flowing inside the air-cooled condenser 120 after being discharged from the receiver drier 160 and the air passing through the air-cooled condenser 120.

As described above, in the third preferred embodiment, the whole area of the water-cooled condenser 110 is used as the condensing region, and the whole area of the air-cooled condenser 120 is used as the supercooling region.

In other words, because the whole area of the water-cooled condenser 110 is used as the condensing region, the refrigerant which is liquefied after being sufficiently condensed in the water-cooled condenser 110 is induced into the receiver drier 160. Thus, the receiver drier 160 secures its original function, thereby discharging only the liquid-phase refrigerant to the downstream side of the receiver drier 160, reducing discharge pressure of the compressor 100 and reducing power consumption of an air conditioner because the system is filled with an adequate refrigerant amount according to the system capacity.

Furthermore, because the whole area of the air-cooled condenser 120 can be utilized as the supercooling region, temperature of the refrigerant gets lower so that the refrigerant can flow into the internal heat exchanger 130 to enhance air-conditioning performance. In this instance, because temperature of the refrigerant induced into the compressor 100 also gets lower, the air conditioner system according to the present invention can prevent a temperature rise of the refrigerant discharged from the compressor 100 and enhance durability and stability of the system.

Meanwhile, the receiver drier 160 serves to separate the refrigerant discharged from the water-cooled condenser 110 into gas-phase refrigerant and liquid-phase refrigerant and store the liquid-phase refrigerant. That is, the receiver drier 160 enhances cooling efficiency by separating the gas-phase refrigerant which is not liquefied in the water-cooled condenser 110 or by absorbing moisture contained in the refrigerant.

Additionally, the internal heat exchanger 130 which exchanges heat between the refrigerant discharged from the air-cooled condenser 120 and the refrigerant discharged from the evaporator 150 is mounted on the refrigerant circulation line (R) between the air-cooled condenser 120 and an expansion valve 140.

In this instance, the internal heat exchanger 130 is arranged on one side of the receiver drier 160 so that the water-cooled condenser 110, the receiver drier 160 and the internal heat exchanger 130 are arranged in a row.

As shown in the drawings, the receiver drier 160 is mounted at the right of the water-cooled condenser 110 and the internal heat exchanger 130 is mounted at the right of the receiver drier 160.

As described above, in the state where the water-cooled condenser 110, the receiver drier 160 and the internal heat exchanger 130 are arranged in a row, the air-cooled condenser 120 is arranged in front of the water-cooled condenser 110, namely, in front of the components arranged in a row, so as to enhance installability inside the engine room of the vehicle, to make the construction of the package easy and to provide various designs.

FIGS. 13 to 17 illustrate an air conditioner system for a vehicle according to a fourth preferred embodiment of the present invention, and only parts which are different from the parts of the first, second and third preferred embodiments will be described.

In the fourth preferred embodiment, an air-cooled condenser 120, a receiver drier 160 and an internal heat exchanger 130 are mounted on a refrigerant circulation line (R) between a water-cooled condenser 110 and an expansion valve 140 to be connected in order in the refrigerant flow direction.

Like the third preferred embodiment, the air-cooled condenser 120 is arranged in front of the water-cooled condenser 110.

Figure 14:
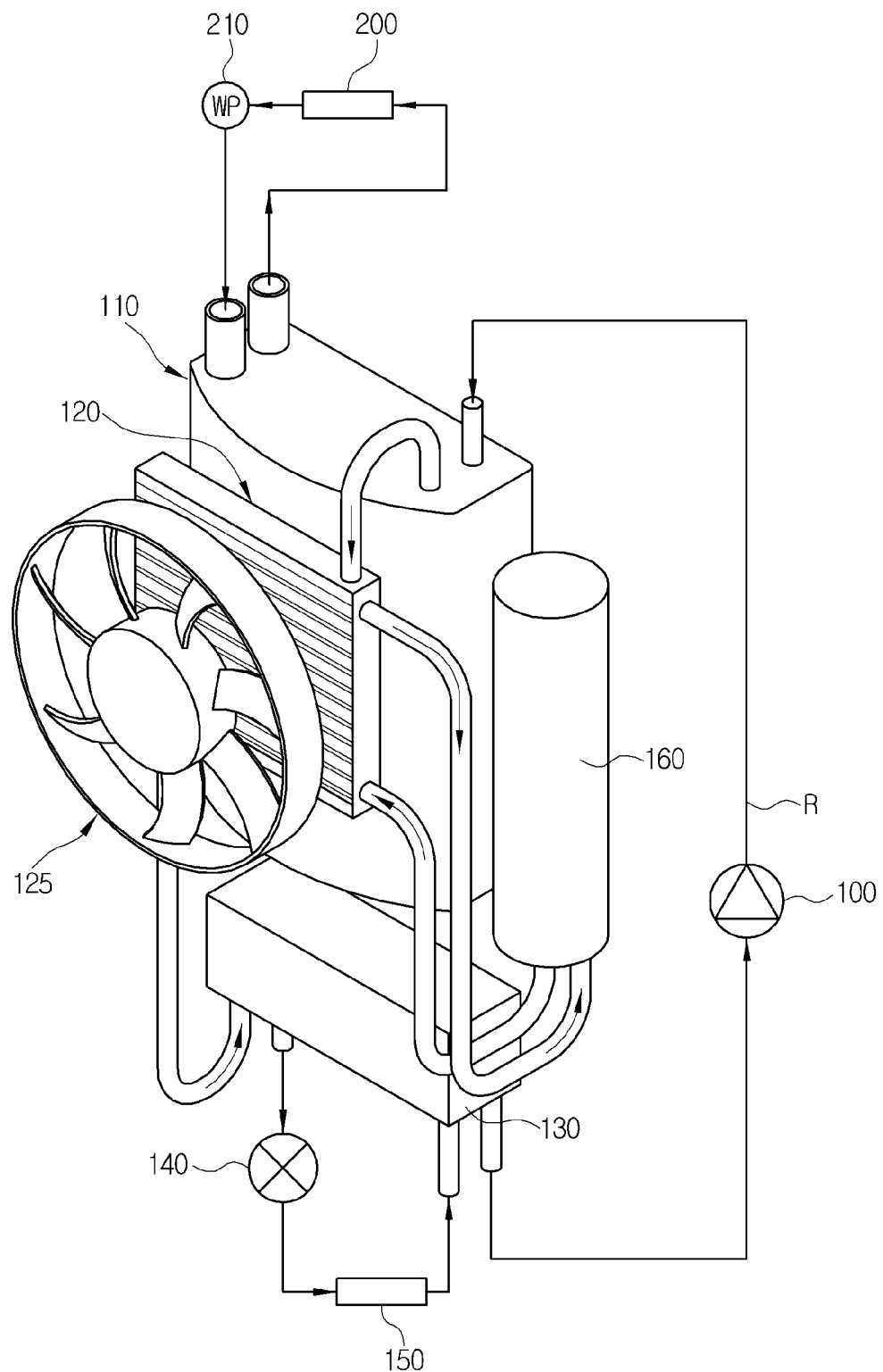
FIG. 14 is a perspective view of the air conditioner system for the vehicle according to the fourth preferred embodiment of the present invention.

Like the third preferred embodiment, the receiver drier 160 is arranged at the left or the right of the water-cooled condenser 110, and in FIG. 14, is arranged at the right of the water-cooled condenser 110.

An inlet of the receiver drier 160 is connected with the condensing region 120*a* of the air-cooled condenser 120 and an outlet is connected with the supercooling region 120*b* of the air-cooled condenser 120, so that the refrigerant condensed in the water-cooled condenser 110 is condensed in the condensing region 120*a* of the air-cooled condenser 120 again and is supercooled in the supercooling region 120*b* of the air-cooled condenser 120 after passing through the receiver drier 160.

In the meantime, an inlet pipe and an outlet pipe are respectively disposed in the condensing region 120*a* and the supercooling region 120*b* to respectively induce and discharge refrigerant.

Additionally, the internal heat exchanger 130 is mounted on the refrigerant circulation line (R) between the air-cooled condenser 120 and the expansion valve 140. In this instance, the internal heat exchanger 130 is arranged below the water-cooled condenser 110 in a state where it is connected with the supercooling region 120*b* of the air-cooled condenser 120.

As described above, in the third and fourth preferred embodiments, when viewed from the air flow direction, the air-cooled condenser 120 is arranged in the front row and the water-cooled condenser 110, the receiver drier 160 and the internal heat exchanger 130 are arranged in the rear row so as to enhance installability inside the engine room of the vehicle by making the construction of the package easy and providing various designs.

FIGS. 18 to 22 illustrate an air conditioner system for a vehicle according to a fifth preferred embodiment of the present invention, and only parts which are different from the parts of the first, second, third and fourth preferred embodiments will be described.

In the fifth preferred embodiment, an air-cooled condenser 120 is mounted on a cowl panel 350 which is mounted between a wind shield glass 360 and an engine hood (not shown) of the vehicle, so that the outdoor air of the cowl panel 350 can be smoothly supplied to the air-cooled condenser 120.

That is, the air-cooled condenser 120 exchanges heat between the air which is supplied from the outside of the cowl panel 350 and passes through the air-cooled condenser 120 and the refrigerant which flows inside the air-cooled condenser 120.

In this instance, the cowl panel 350 includes a mounting part 351 for communicating the outside of the cowl panel 350 with the inside of the engine room of the vehicle, and the air-cooled condenser 120 is mounted on the mounting part 351.

The mounting part 351 is formed by a through hole formed in the cowl panel 350 to be as big as the air-cooled condenser 120. In this instance, the mounting part 351 is formed in a rectangular shape because the air-cooled condenser 120 is in a rectangular form.

Moreover, a blower fan 125 is mounted at the upper portion or the lower portion of the cowl panel 350 where the mounting part 351 is located in order to forcedly supply the outdoor air of the cowl panel 350 toward the air-cooled condenser 120.

Therefore, when the vehicle travels, the outdoor air of the cowl panel 350 is supplied to the air-cooled condenser 120 using static pressure by traveling wind to cool the refrigerant. When the vehicle idles, the blower fan 125 is operated so that the outdoor air of the cowl panel 350 is forcedly supplied to the air-cooled condenser 120 to cool the refrigerant.

Figure 18:
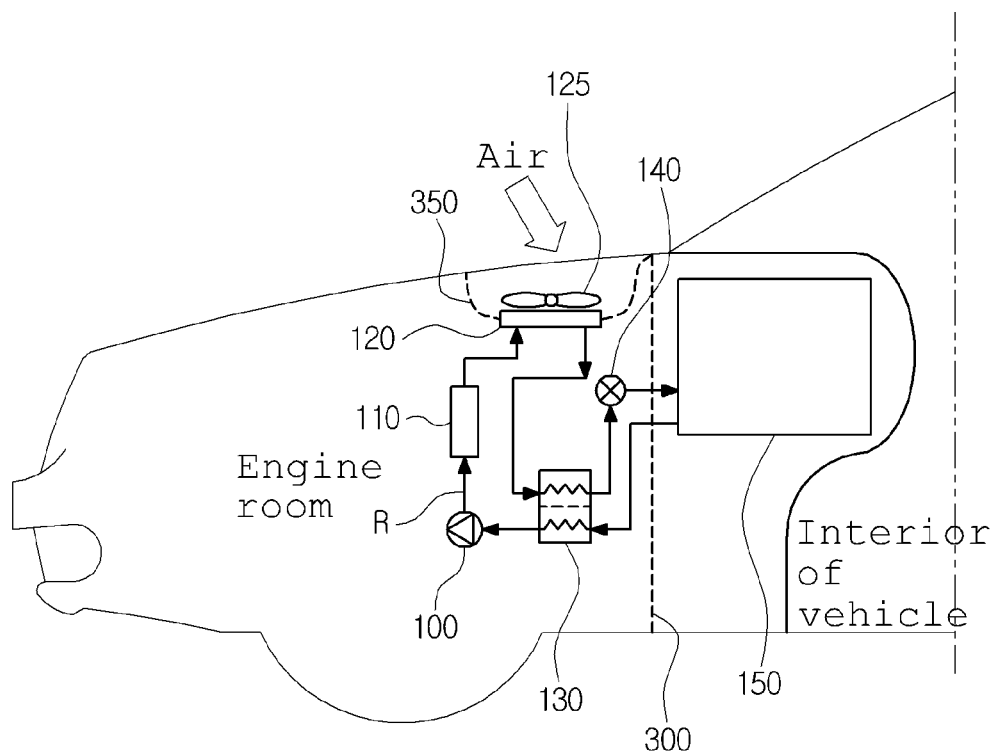
FIG. 18 is a schematic diagram showing an air conditioner system according to a fifth preferred embodiment of the present invention is installed in a vehicle.
Figure 19:
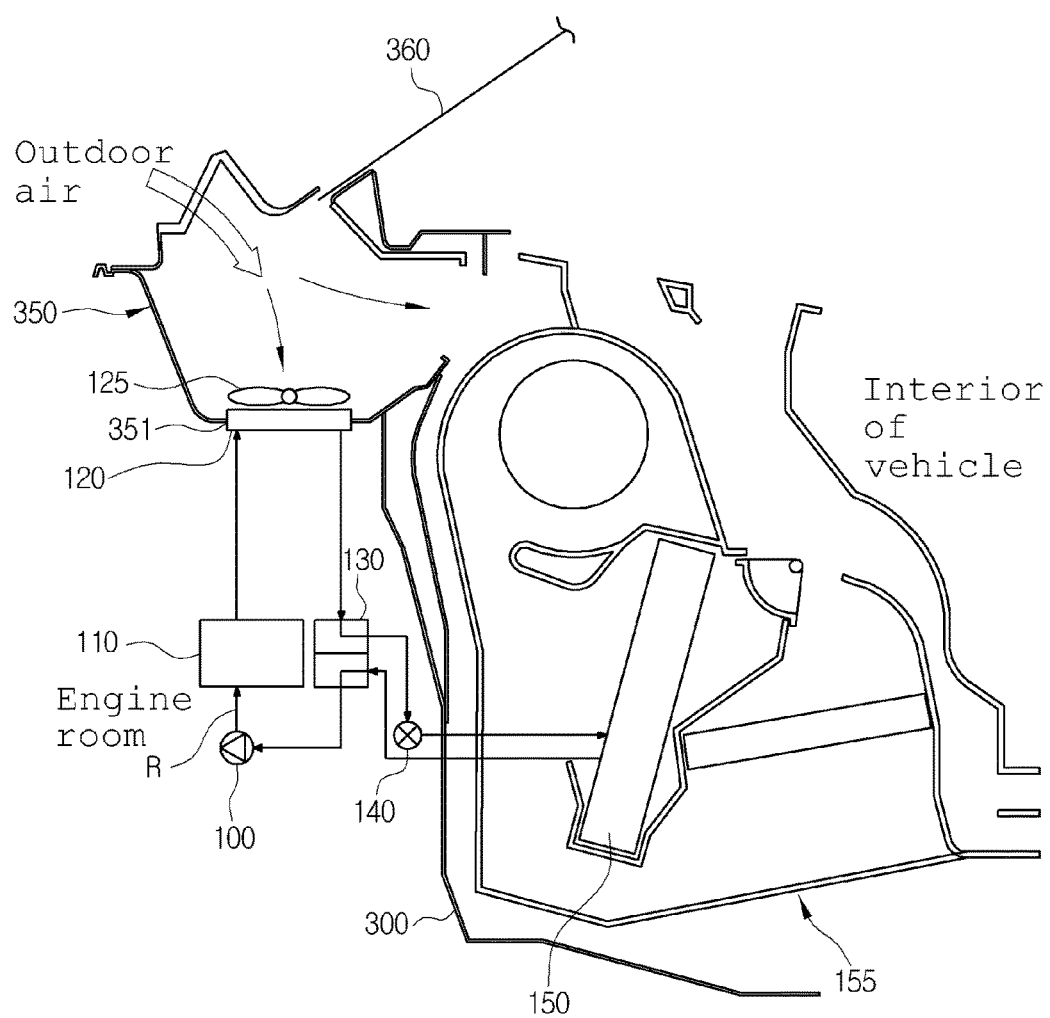
FIG. 19 is a detailedly sectional view of the air conditioner system according to the fifth preferred embodiment of the present invention.

Meanwhile, FIGS. 18 and 19 illustrate the water-cooled condenser 110 and the air-cooled condenser 120 which are spaced apart from each other, but the water-cooled condenser 110 may be arranged adjacent to one side (lower part) of the air-cooled condenser 120 mounted on the mounting part 351.

As described above, because the air-cooled condenser 120 is mounted at the front side of the vehicle but on the cowl panel 350, a distance among the air-cooled condenser 120, the evaporator 150 mounted in the interior of the vehicle, the water-cooled condenser 110 mounted in the engine room and the compressor 100 is reduced, thereby simplifying and reducing the package of the entire air conditioner system and reducing the refrigerant amount and manufacturing costs due to the short refrigerant circulation line (R).

Furthermore, because the air-cooled condenser 120 is mounted on the cowl panel 350 inside the system having the water-cooled condenser 110 and the air-cooled condenser 120, the duct for supplying outdoor air to the air-cooled condenser 120 can be omitted or simplified in structure, thereby simplifying the package and enhancing air-conditioning performance by effectively supplying the outdoor air to the air-cooled condenser 120.

Additionally, because the air-cooled condenser 120 is mounted on the cowl panel 350 of the vehicle, the air-cooled condenser 120 can escape the influence of the high-temperature air of the engine room which flows backward toward the front side of the vehicle at the time of idling of the vehicle, thereby lowering temperature of the air induced into the air-cooled condenser 120 and enhancing air-conditioning performance.

Figure 20:
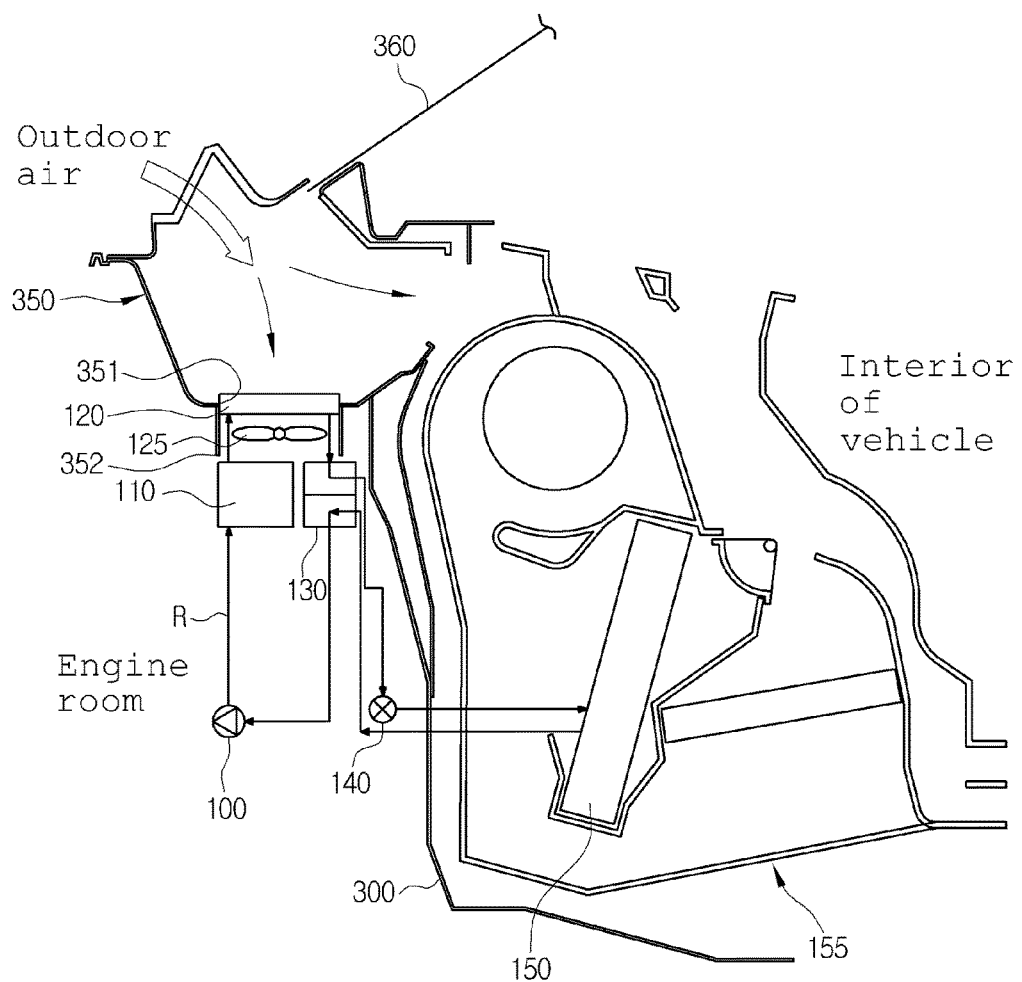
FIG. 20 is a sectional view showing a state where a connection duct is mounted on a mounting part of a cowl panel in FIG. 19.

In addition, if the cowl panel 350 is short of an area to install the air-cooled condenser 120, as shown in FIG. 20, an extension duct 352 is mounted on the mounting part 351 of the cowl panel 350.

The extension duct 352 extends to a predetermined length toward the engine room from the mounting part 351, and in this instance, the air-cooled condenser 120 is mounted inside the extension duct 352.

Moreover, the blower fan 125 is also mounted inside the extension duct 352 to forcedly supply the outdoor air of the cowl panel 350 toward the air-cooled condenser 120.

Furthermore, as shown in FIG. 20, it is preferable that the water-cooled condenser 110 and the internal heat exchanger 130 be mounted adjacent to the lower portion of the blower fan 125.

In other words, because the water-cooled condenser 110 and the internal heat exchanger 130 are mounted adjacent to the lower portion of the blower fan 125, the air used to cool the air-cooled condenser 120 when the blower fan 125 is operated can be reused to cool the water-cooled condenser 110 and the internal heat exchanger 130 so as to enhance air-conditioning performance more. That is, the refrigerant can be cooled further while the air passing through the air-cooled condenser 120 flows along the outer surfaces of the water-cooled condenser 110 and the internal heat exchanger 130.

Figure 21:
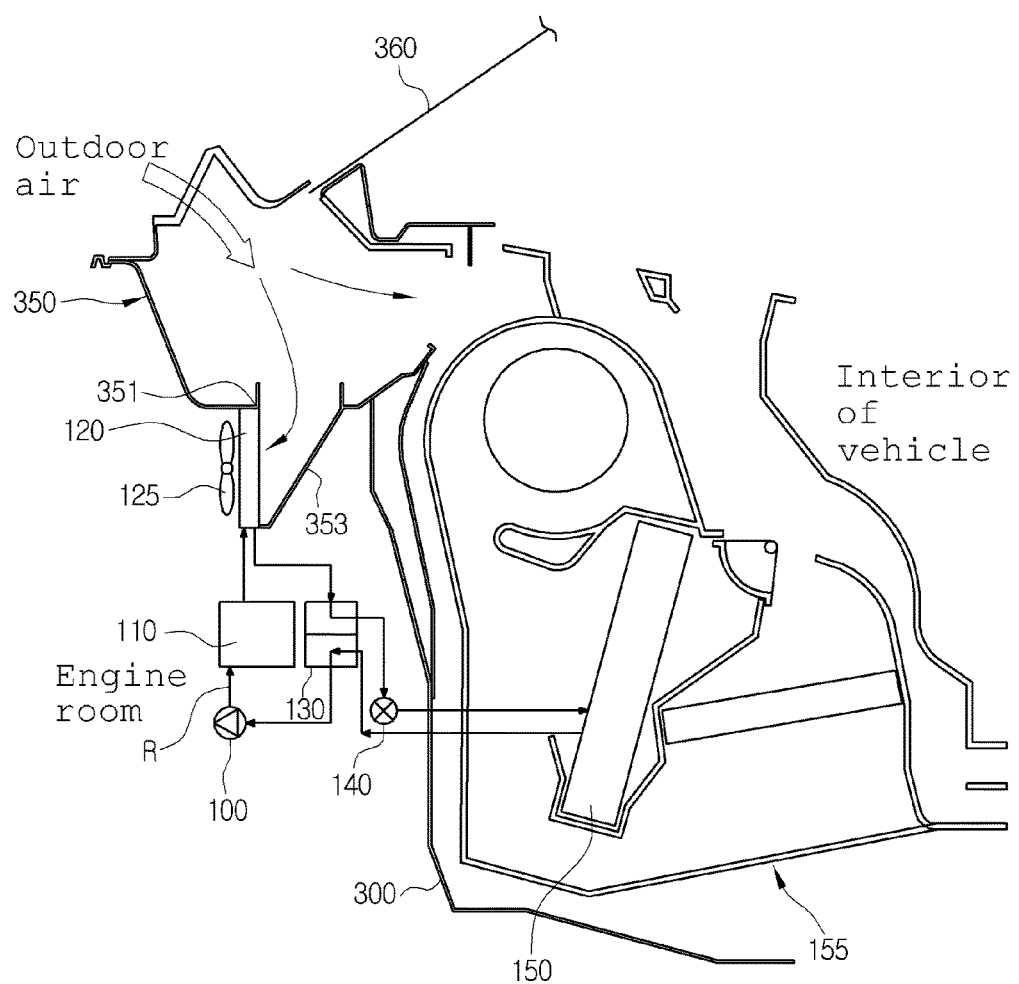
FIG. 21 is a sectional view showing a state where the connection duct is mounted on the mounting part of the cowl panel and an air-cooled condenser is arranged below the cowl panel in the vertical direction in FIG. 19.

Additionally, if it is impossible to mount the air-cooled condenser 120 on the cowl panel 350 in the transverse direction, as shown in FIG. 21, the air-cooled condenser 120 is mounted below the cowl panel 350 in the perpendicular direction, and a connection duct 353 which connects the outside of the cowl panel 350 and the air-cooled condenser 120 with each other is mounted on the cowl panel 350 in order to supply the outdoor air of the cowl panel 350 toward the air-cooled condenser 120.

The connection duct 353 is formed to change the flow of the air at an angle of 90 degrees. In this instance, the connection duct 353 is mounted in such a way that one end portion of the connection duct 353 is located at the upper portion of the cowl panel 350 and the other end portion is connected with the air-cooled condenser 120 mounted below the cowl panel 350.

In addition, the blower fan 125 is mounted on one side of the air-cooled condenser to forcedly supply the outdoor air of the cowl panel 350 toward the air-cooled condenser 120 through the connection duct 353.

As described above, even though the air-cooled condenser 120 is mounted below the cowl panel 350 in the perpendicular direction, the outdoor air of the cowl panel 350 can be smoothly supplied to the air-cooled condenser 120 through the connection duct 353.

Meanwhile, not shown in the drawings, but in the fifth preferred embodiment, a receiver drier may be also mounted on the refrigerant circulation line (R) between the water-cooled condenser 110 and the internal heat exchanger 130 in order to separate the refrigerant into gas-phase refrigerant and liquid-phase refrigerant and store the liquid-phase refrigerant.

Figure 22:
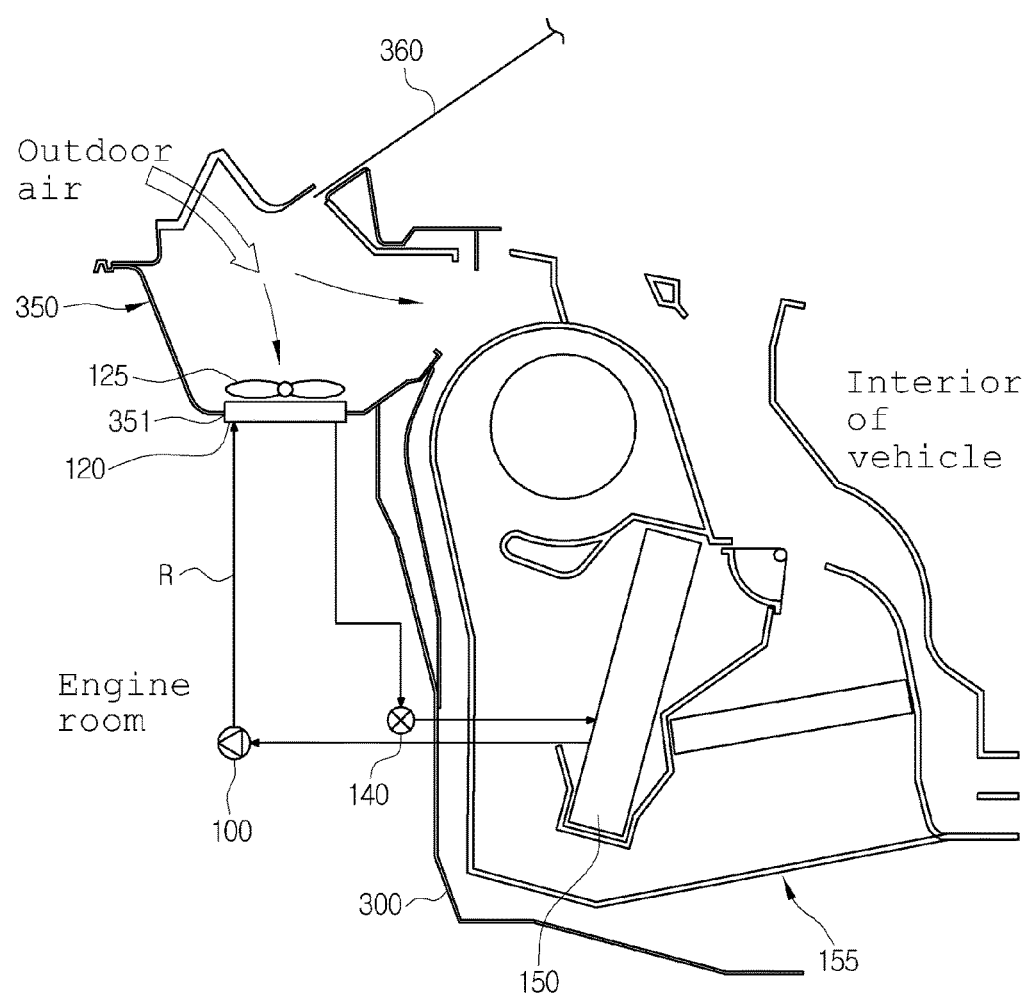
FIG. 22 is a sectional view showing a state where a water-cooled condenser and an internal heat exchanger is omitted from the air conditioner system of FIG. 19.

FIG. 22 is a sectional view showing a state where the water-cooled condenser and the internal heat exchanger are omitted from the air conditioner system according to the fifth preferred embodiment. Even in the air conditioner system from which the water-cooled condenser 110 and the internal heat exchanger 130 are omitted, when the air-cooled condenser 120 is mounted on the cowl panel 350, the previously described effect can be obtained.

| Explanation of reference numerals in drawings | |
|---|---|
| 100: | Compressor |
| 110: | Water-cooled condenser |
| 111: | Refrigerant flow channel |
| 112: | Coolant flow channel |
| 120: | Air-cooled condenser |
| 120a: | Condensing region |
| 120b: | Supercooling region |
| 125: | Blower fan |
| 130: | Internal heat exchanger |
| 140: | Expansion valve |
| 150: | Evaporator |
| 200: | Water-cooled radiator |
| 350: | Cowl panel |
| 351: | Mounting part |
| 352: | Extension duct |
| 353: | Connection duct |

The invention claimed is:

1. An air conditioner system for a vehicle which includes: a compressor for compressing refrigerant; a water-cooled condenser which exchanges heat between coolant and the refrigerant flowing after being discharged from the compressor to condense the refrigerant; an expansion valve adapted for expanding the refrigerant flowing after being discharged from the water-cooled condenser; an evaporator for evaporating the refrigerant flowing after being discharged from the expansion valve; and a refrigerant circulation line which connects the compressor, the water-cooled condenser, the expansion valve and the evaporator with one another in order, the air conditioner system comprising:

two air-cooled condensers which are connected on the refrigerant circulation line between the water-cooled condenser and the expansion valve in order to further cool the refrigerant by exchanging heat between the refrigerant and air; and a blower fan installed between the two air-cooled condensers and configured to blow air in a first an air flow direction, wherein the two air-cooled condensers and the blower fan are arranged in a row along a common axis in the air flow direction, with the blower fan located between the two air-cooled condensers in the air flow direction, and wherein the two air-cooled condensers and the blower fan are aligned with, and arranged within a width of the water-cooled condenser in the air flow direction.

2. The air conditioner system according to claim 1 wherein the two air-cooled condensers and blower fan are positioned between the water cooled condenser and a receiver drier in a second direction being perpendicular to the air flow direction.

3. The air conditioner system according to claim 1 wherein the two air-cooled condensers are mounted such that they are spaced apart from each other at a predetermined interval in the air flow direction.

4. The air conditioner system according to claim 3, further comprising:
a receiver drier arranged on one side of the air-cooled condensers to separate the refrigerant circulating the refrigerant circulation line into gas-phase refrigerant and liquid-phase refrigerant and to store the liquid-phase refrigerant,
wherein an inlet of the receiver drier is connected with one of the two air-cooled condensers and an outlet of the receiver drier is connected with the other one.

5. The air conditioner system according to claim 1, further comprising:
a receiver drier arranged on one side of one of the two air-cooled condensers to separate the refrigerant circulating the refrigerant circulation line into gas-phase refrigerant and liquid-phase refrigerant and to store the liquid-phase refrigerant.

6. The air conditioner system according to claim 5, wherein each of the two air cooled condensers comprises a condensing region which exchanges heat between the refrigerant and the air and a supercooling region which exchanges heat between the refrigerant passing through the condensing region and the air, and
wherein an inlet of the receiver drier is connected with the condensing region of each of the two air-cooled condensers and an outlet of the receiver drier is connected with the supercooling region of each of the two air-cooled condensers.

7. The air conditioner system according to claim 5, further comprising:
an internal heat exchanger which is mounted on the refrigerant circulation line between the two air-cooled condensers and the expansion valve to exchange heat between the refrigerant discharged from the two air-cooled condensers and the refrigerant discharged from the evaporator,
wherein the internal heat exchanger is arranged on one side of the receiver drier.

* * * * *